United States Patent [19]

Calderazzo

[11] 4,134,481
[45] Jan. 16, 1979

[54] BACK-PEDAL BRAKE OPERATOR AND BRAKING SYSTEM FOR MULTI-SPEED BICYCLES

[76] Inventor: Franklin J. Calderazzo, 144 Flax Hill Rd., Norwalk, Conn. 06854

[21] Appl. No.: 658,129

[22] Filed: Feb. 13, 1976

Related U.S. Application Data

[63] Continuation-in-part of Ser. No. 530,838, Dec. 9, 1974, abandoned.

[51] Int. Cl.² .................. B60K 29/02; F16D 67/00
[52] U.S. Cl. .......................................... 192/5; 188/24
[58] Field of Search ................. 192/5, 6 A; 188/24

[56] References Cited

U.S. PATENT DOCUMENTS

| 590,489 | 9/1897 | Staberg et al. | 192/5 |
| 639,265 | 12/1899 | Morris | 192/5 |
| 2,094,687 | 10/1937 | Thompson | 192/5 |
| 2,342,795 | 2/1944 | Durand | 192/5 |

FOREIGN PATENT DOCUMENTS

| 829255 | 3/1938 | France | 192/5 |
| 1028004 | 2/1953 | France | 192/5 |

*Primary Examiner*—Benjamin W. Wyche
*Attorney, Agent, or Firm*—Parmelee, Johnson, Bollinger & Bramblett

[57] ABSTRACT

Back-pedal brake operator for multi-speed bicycles in which the brake operating action is obtained by turning the foot pedals rearwardly a short distance from any position which the pedals may occupy at the instant when the driver wishes to apply braking action, the braking operation being obtained without utilizing the sprocket chain to apply the braking force, and the brakes are automatically released without any "lock-up" effect when the driver starts pedaling forward in the normal manner. The back-pedal operators shown are directly associated with the sprocket assembly as a compact self-contained unit integrated therewith and can be installed as original equipment by bicycle manufacturers or can be retrofitted by bicycle shops or owners on existing multi-speed bicycles. The bicycle is permitted to be wheeled freely rearwardly without the brakes becoming applied. The back-pedal brake operator can be adapted for adjustable automatic proportioning of the relative braking efforts to be exerted on the rear and front wheels. This invention also enables dual actuated braking systems to be installed in multi-speed bicycles for either hand or foot operation (or both) of the brakes. The presently preferred braking system automatically applies a relatively greater braking effort to the rear wheel than to the front wheel.

31 Claims, 15 Drawing Figures

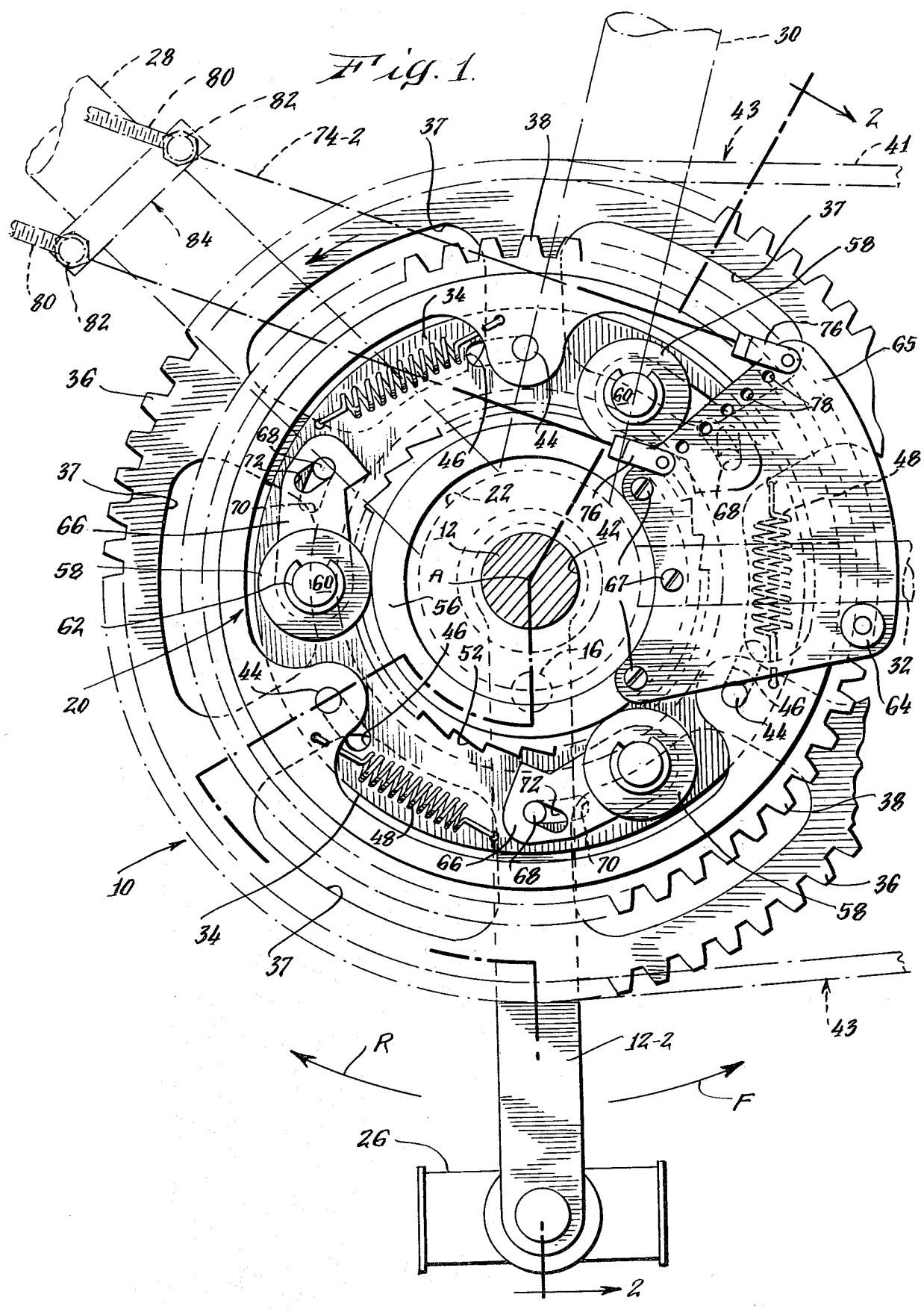

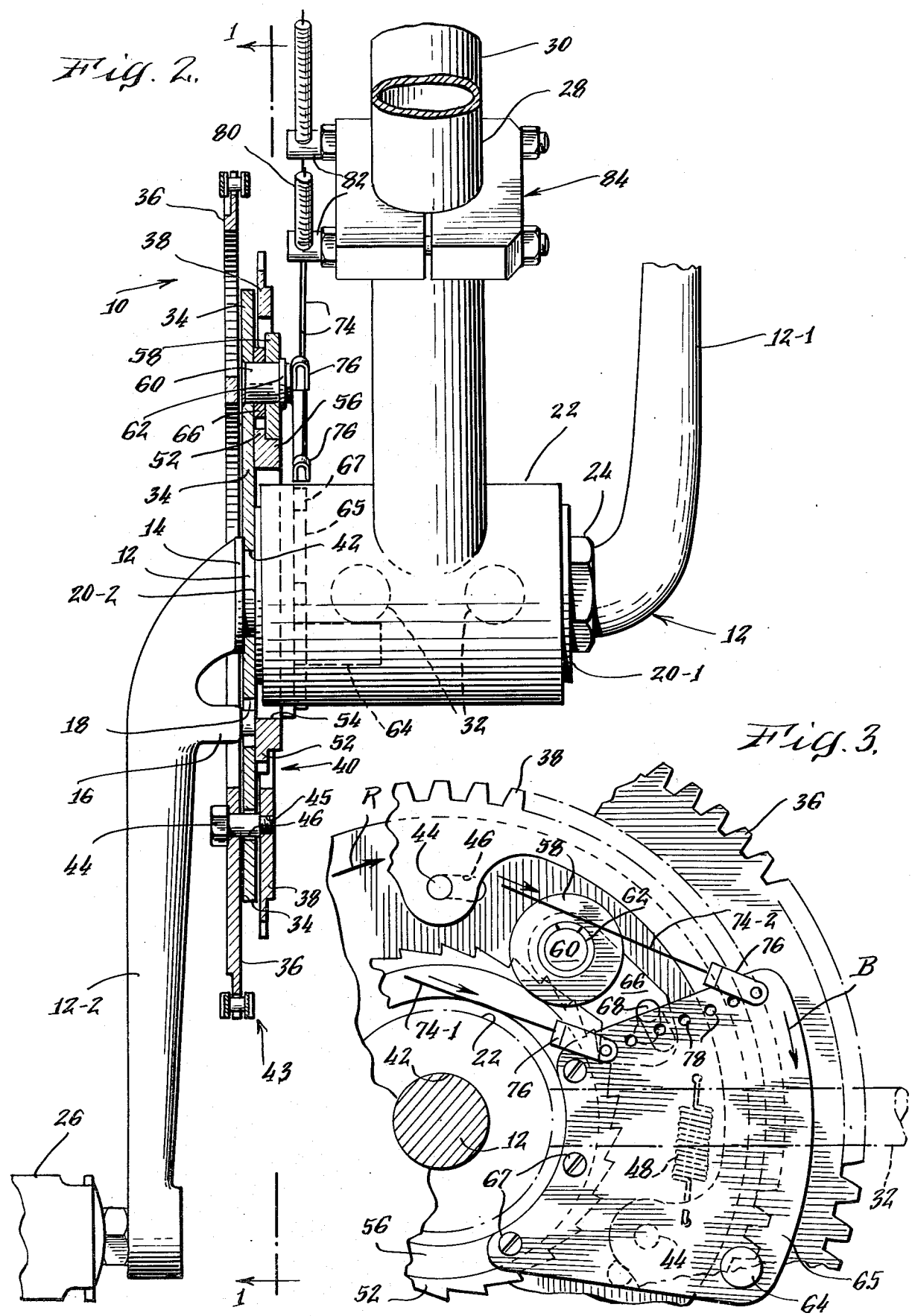

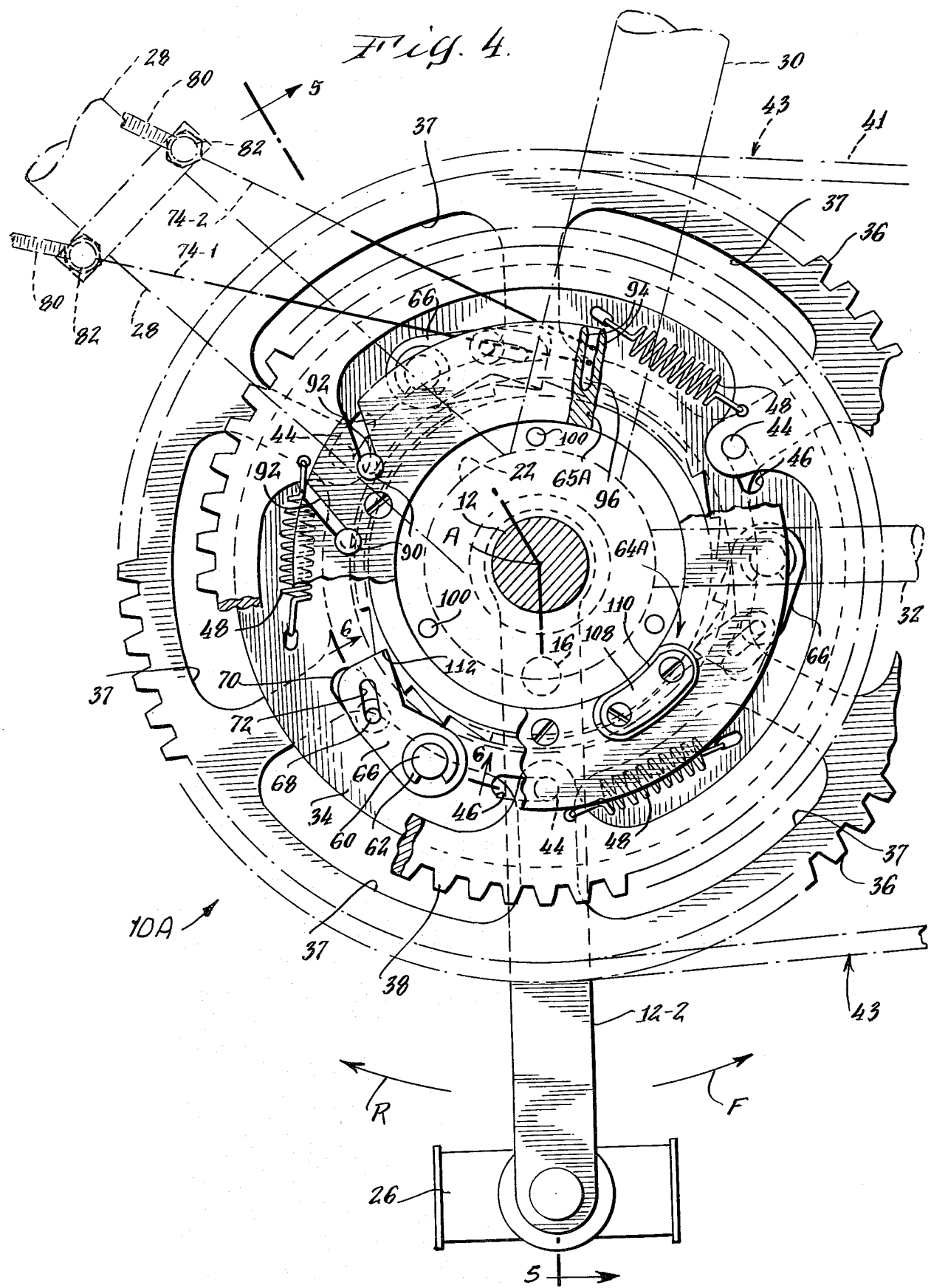

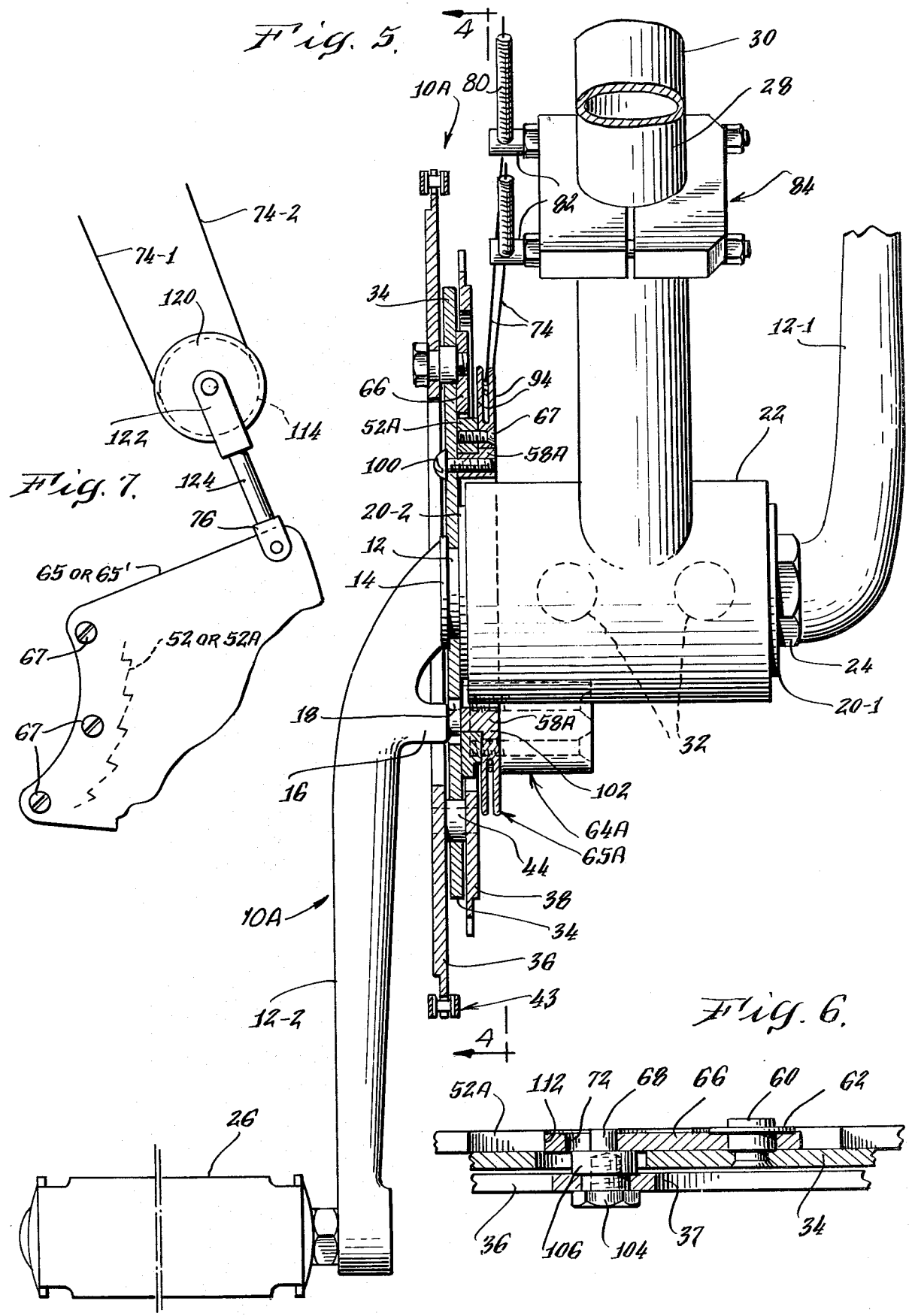

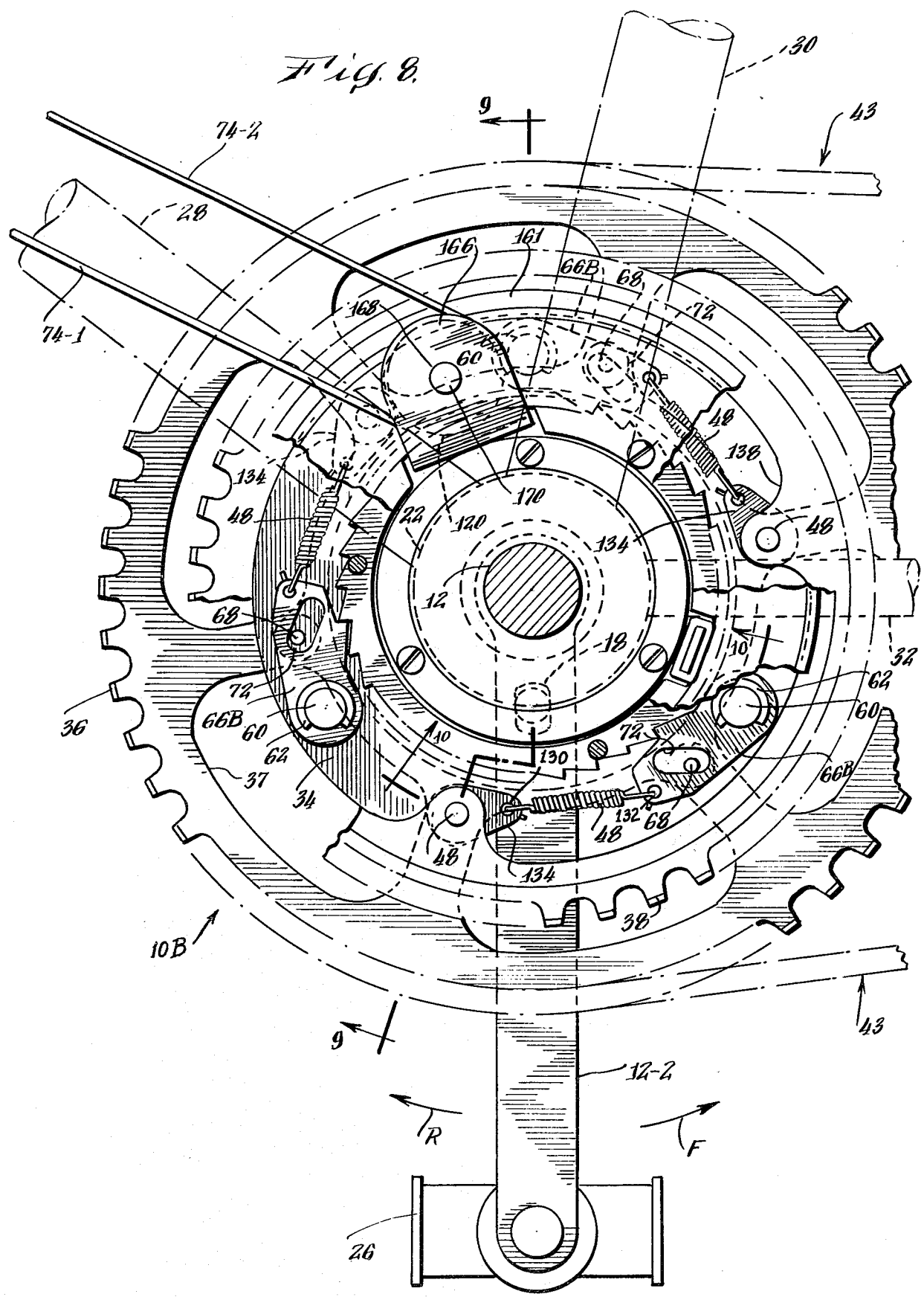

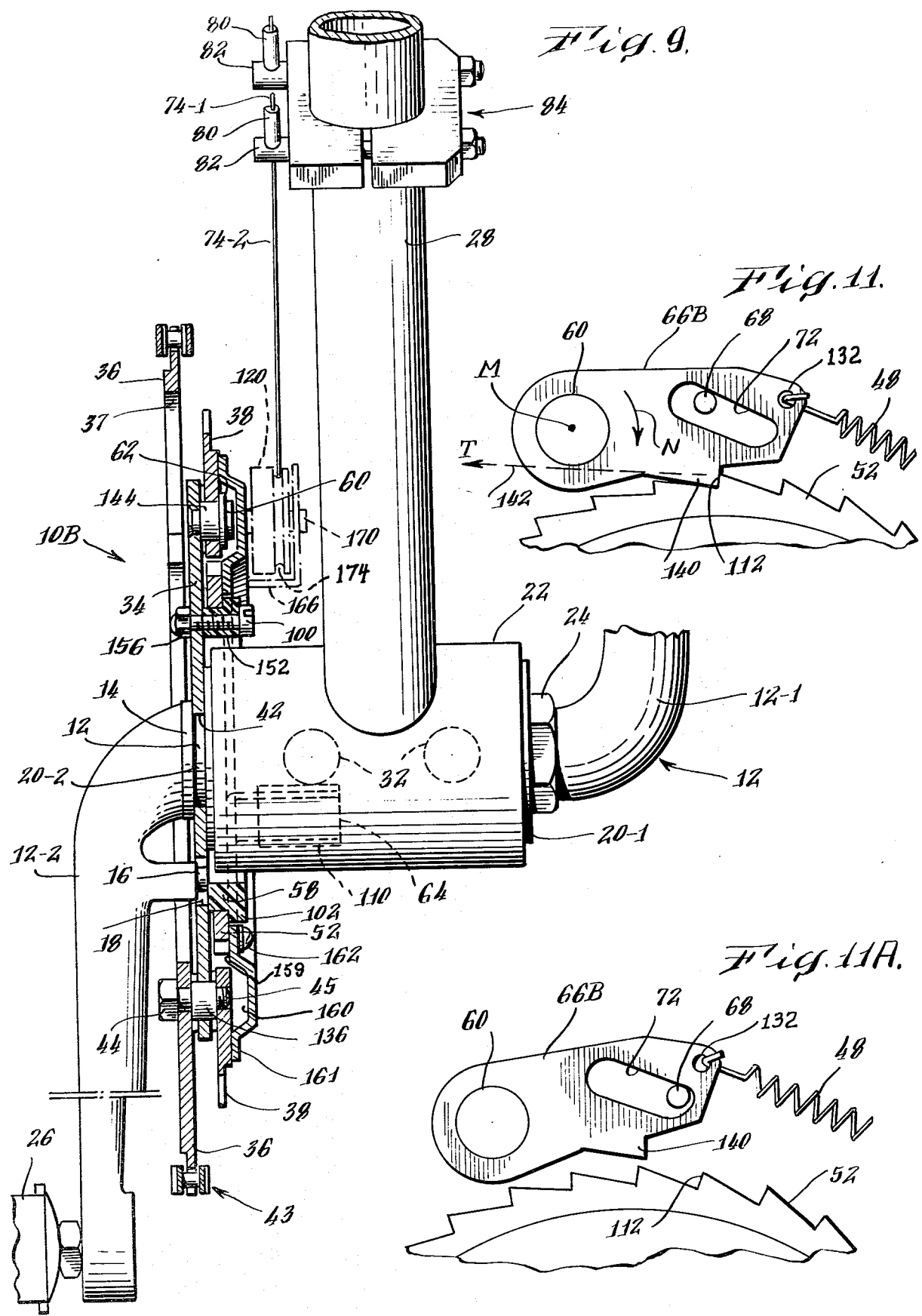

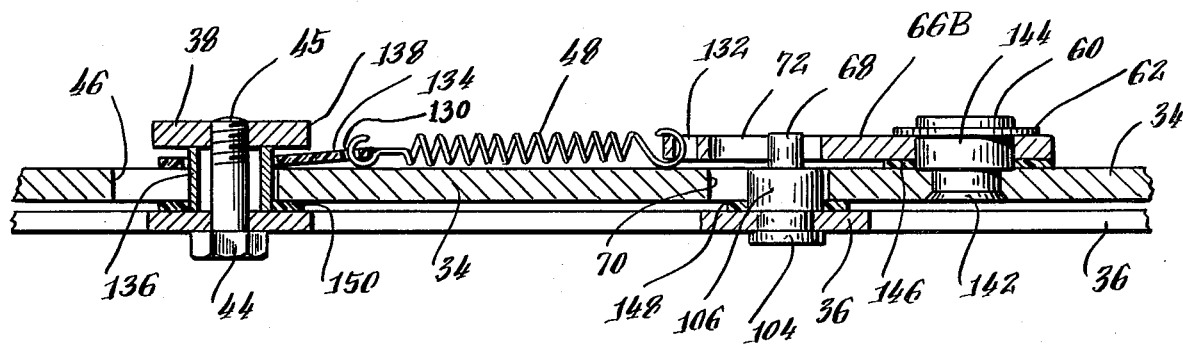
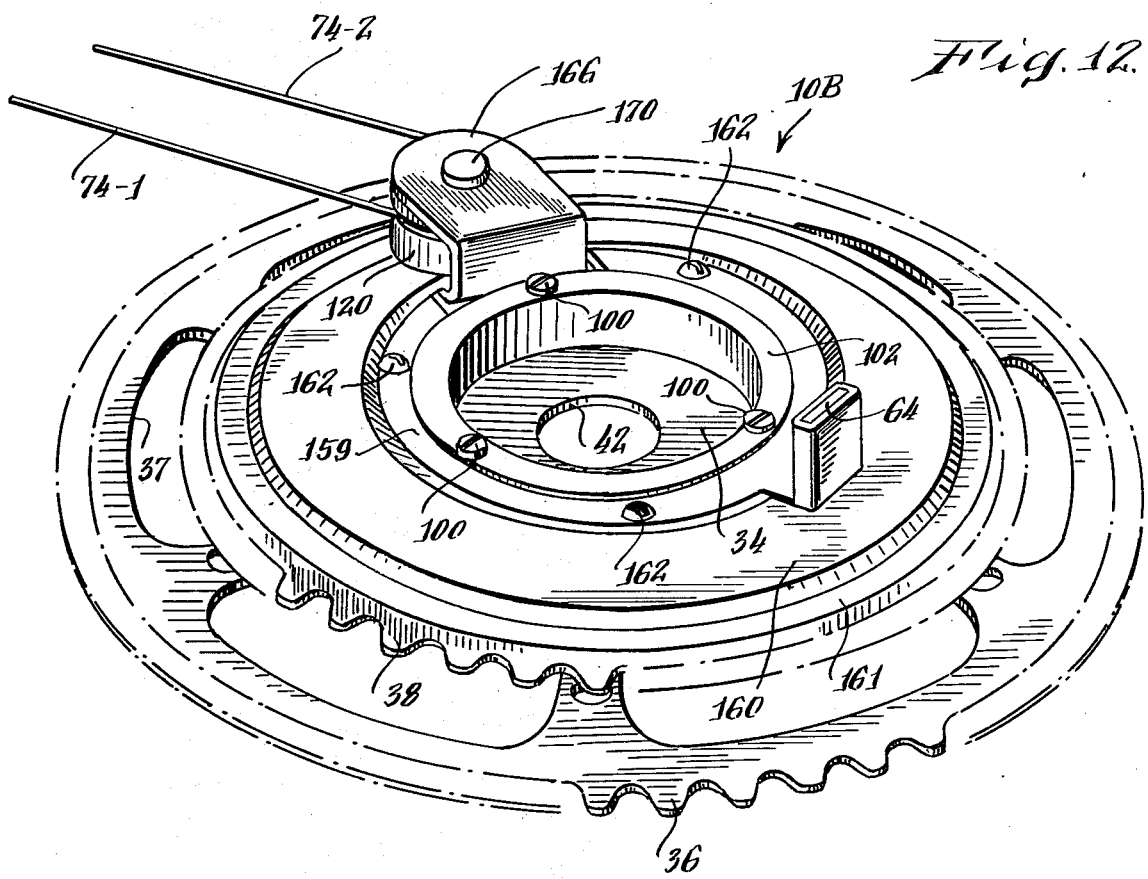

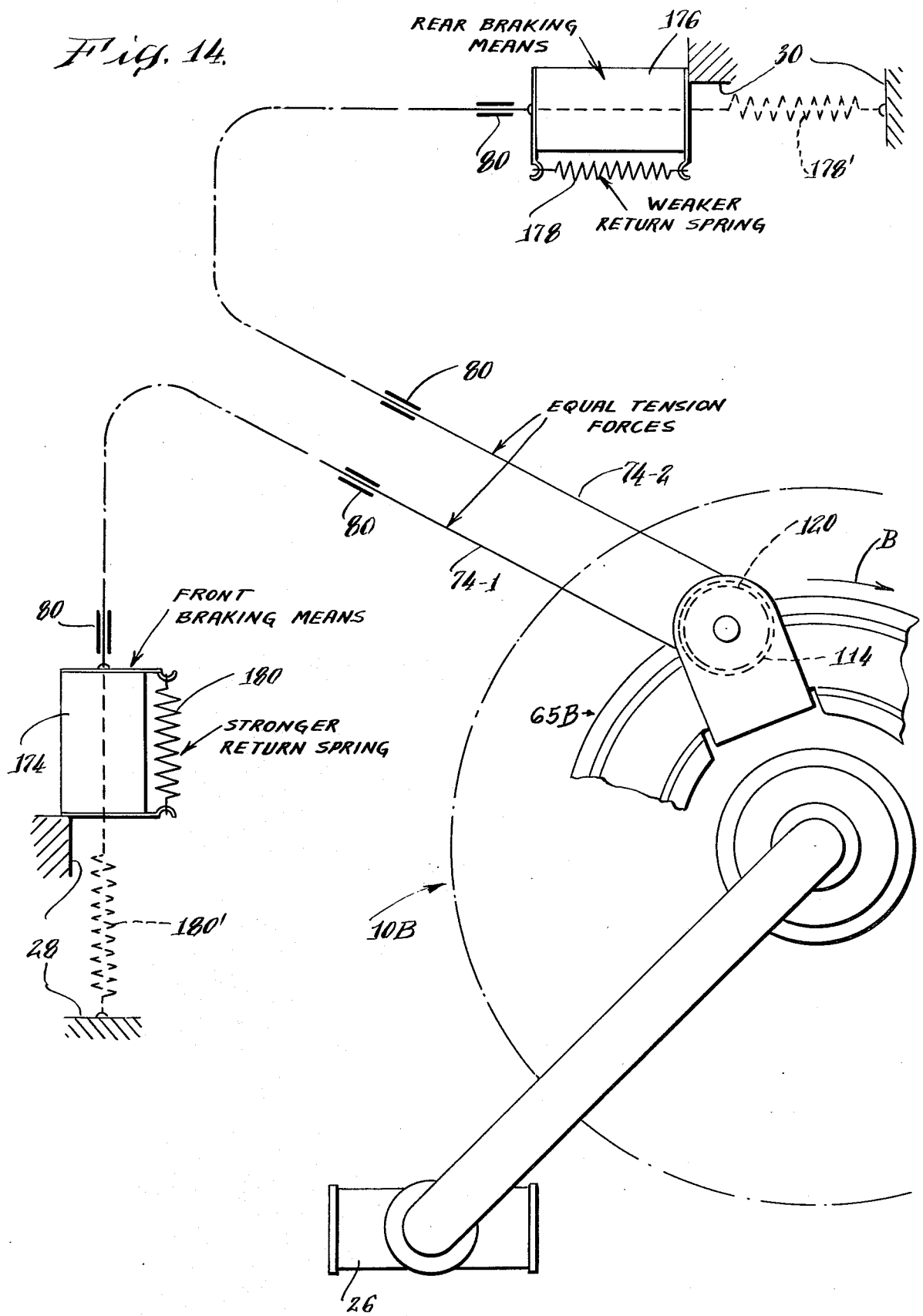

BACK-PEDAL BRAKE OPERATOR AND BRAKING SYSTEM FOR MULTI-SPEED BICYCLES

RELATED APPLICATIONS

This is a continuation-in-part of prior copending application Ser. No. 530,838, filed Dec. 9, 1974, and now abandoned.

BACKGROUND OF THE INVENTION

There are millions of modern multi-speed bicycles in use in the United States and many more millions are being manufactured and sold each year in addition to many imported multi-speed bicycles. In many of these multi-speed bicycles, the speed ratio or gear ratio between the driving (front) sprocket which is turned by the foot pedal cranks and the driven (rear) sprocket at the rear wheel is changed by derailing the sprocket chain to shift it between sprockets of various sizes. For example, in the so-called "ten speed" bicycles which are very popular at the present time, there are two front sprockets and five rear sprockets. The chain can be derailed and shifted by respective hand-lever operated derailer mechanisms positioned near the front and rear sprockets to provide a driving relationship between either of the front sprockets and any one of the five rear sprockets, thus achieving ten different gear ratios, as may be desired by the rider for traversing various inclines or level stretches of roadway at various speeds. There are also five-speed bicycles in which a single front sprocket is used with five rear sprockets. A single derailer mechanism is associated with the multiple rear sprockets for shifting the chain onto the respective rear sprockets to provide the five different driving ratios. These ten speed, five speed and similar multi-speed bicycles are referred to herein as the "chain derailer" type.

In addition, there are many multi-speed bicycles in which a gear shifting mechanism is included within the hub of the rear wheel, for example, to provide three different driving ratios. The rear hub gear shifting bicycles are referred to herein as the multi-speed "gear shifter" type.

Since the invention and development of such modern bicycles, the advantages of back-pedal braking have been recognized. Much work has been done on back-pedal brake systems and much prior art exists. Yet today in the marketplace in the United States, no practical system for back-pedal braking of the popular multi-speed "chain derailer" type bicycle exists. Hand-operated braking systems must be used.

Before the advent of multi-speed bikes, the "coaster" brake was the most popular type of bicycle brake. The "coaster" brake mechanism was housed in the rear hub, and brake operation was obtained by reversing the pedals, thereby tensioning the bottom of the chain, which applied reverse torque to the rear sprocket for applying the brake.

The three-speed bicycle involved a gear mechanism located within the hub of the rear wheel as mentioned above. When attempts were made to include a "coaster" brake within the rear hub, together with the gear shifter mechanism, the rear hub became quite large, bulky and complex, causing severe disadvantages from a practical viewpoint. Thus, as a practical matter, in the marketplace in the United States, hand-operated braking systems are also used with multi-speed gear shifter type bicycles.

In these various multi-speed chain derailer and gear shifter bicycles, as now existing in the U.S. marketplace, the brake mechanisms for the front and rear wheels are actuated by respective hand-operated levers positioned on the handle bar near the handle grips. There are a number of serious disadvantages or safety hazards inherent in these hand-operated lever braking systems, as now existing in the marketplace, as follows:

1. The rider must partially release his hold on the handle grip in order to extend his fingers to reach and grasp and squeeze the brake lever. If the bicycle is negotiating a bumpy, pebbled or slippery surface, the momentary release of the handle grips can cause loss of steering control.
2. A substantial hand span or finger extension is required to reach the brake-actuating levers. If the rider is a young person or an adult with small hands, it is quite difficult for the rider to reach the brake lever while adequately holding onto and controlling the handle bar grip.
3. The front and rear brake mechanism are controlled by separate levers, which arrangement presents hazards when riding down hill or at substantial speed. If the rear brake mechanism fails, or if the rider squeezes too hard on the lever for the front brake, the front wheel may suddenly stop, thereby flipping the bicycle and catapulting the rider head-first over the front wheel.
4. On different bicycles the hand levers are located in different places and at different distances (spans) from the hand grips, depending on the orientation and placement of their mounting clamps on the handle bars. When a rider is using a borrowed or a rented bicycle in which the brake levers are located differently from those on a familiar bicycle, there is an awkward or hazardous delay in applying the brakes while the rider's fingers are nervously searching out the location of the brake levers. Alternatively, the rider may avert his eyes from the path ahead in an emergency to look down to find the levers. This diversion of vision is undesirable and can be very dangerous when automotive traffic is near.
5. When the hand brakes are suddenly applied in an emergency stop, the bicycle may start to skid or lean over. The human reflex action is often to tighten the grip, which jams the brakes and worsens the incipient skid.
6. When using the racing style handle bar with the underslung U-shaped hand grip, most riders cruise with their hands on the straight horizontal central portions of the handle bar, because this central portion is higher, thereby enabling the rider to sit up straighter. The brake levers are often mounted down near the underslung hand grips. Thus, the rider must release both hands and completely shift both hands down to new positions in order to reach the brake levers. In some cases, auxiliary levers are installed so that the rider can reach this auxiliary lever with the hands remaining in the cruising position. These auxiliary levers increase the complexity and expense. In addition, they are not available on many modern bicycles, leading to such hazards as described under paragraph No. 4 above, when the rider has become accustomed to using them on a familiar bicycle. On camping trips, some riders cannot carry all of the desired gear on their back or on a carrier over the rear wheel. Some equipment then ends up strapped to the handle bar, in which case the auxiliary lever can become accidentally jammed, preventing the brake from being applied by use of the regular lever.

7. Also, there are times when a bicycle rider may wish to reach out to ward off an impact, and at such an instant, the rider is forced to abandon any chance of using the hand-brake lever on the respective side where the arm is being extended. It may be the rear brake which is abandoned, leaving only the front brake, which can veer the bicycle off from the rider's intended track.

8. Observation of hundreds of multi-speed bicycle riders has revealed that in the majority of cases, the rider's hands are not on the brake levers most of the time. This means a greater elapsed time between the decision that a stop should be made and the movement when the hands reach and grasp the levers for applying braking action. In contrast, in the majority of cases for most of the time, the rider's feet are resting on the pedals so that a lesser elapsed time occurs between the decision to stop and the movement when braking action is applied by back-pedal action.

9. The hands are busy performing many functions: steering, shifting, helping to maintain body balance, giving hand signals, sometimes holding a package, or warding off bushes or twigs, in general, very busy. Whereas, the feet have only one function to perform. This invention relieves the hands of one major activity and assigns it to the feet.

10. In the average person, the leg muscles are more powerful than the hand-span and, therefore, are more suited for applying the braking action.

Thus, as pointed out above, there are serious disadvantages or safety hazards involved with hand-operated lever braking systems for multi-speed chain derailer or gear shifter bicycles. These disadvantages and hazards are augmented in the case of children whose hands are weaker and who often ride their bicycles at top speed with exhuberance under conditions where an adult would proceed cautiously, the children tending to rely on their ability to brake suddenly at the last instant.

The factor which does not allow the application of the "coaster" brake to the "chain-derailer" type bicycles is the fact that the chain cannot apply a reverse load (reverse torque) to the rear sprocket because of the slack which must be provided in the chain arrangement and the spring-biased take-up jockey wheel or equivalent slack take-up mechanism associated with the bottom portion of the chain.

In addition, the "coaster" brake, being actuated by the chain, could only operate the rear wheel brake which also is a disadvantage wherever two-wheel braking is desired as being more efficient.

THE PRIOR ART

Much prior art exists in the United States Classification Class 192, Sub-Class 5, describing various mechanisms for implementing back-pedal actuated braking. There are more than ninety patents in Class 192, subclass 5. Almost all of these prior devices are not practical because of an inherent "lock-up" problem, plus an inability to wheel the bicycle backwards without causing the braking mechanism to apply itself. In addition, many of these prior apparatus are not suitable for use on chain derailer bicycles.

This lock-up occurs when the bicycle is brought to a complete stop with the brake applied. The explanation of the lock-up phenomenon is as follows: Most braking systems described in the prior art consist of a mechanism actuated by back-pedaling which, in turn, causes the brakes to be applied to the wheels. The way in which these prior art braking systems are intended to be released is by pedaling in the forward direction. However, after the bicycle has been brought to a complete stop using the brakes, the brakes are now holding the rear wheel and/or front wheel stationary. Therefore, the necessary step of pedaling forward to release the brakes entails overpowering the friction force of the brakes which are still holding the wheels stationary.

In cases where the brakes have been applied suddenly and forcefully, the friction force of the brakes of the wheels is great, essentially locking up the wheels. Thus, attempting to release the brakes by pedaling forward would require a strong effort to overcome the locked-up braked condition. This prior art problem of the brake "lock-up" prevents the prior art devices from being practical mechanisms.

Another problem which exists in the prior art is that the bicycle cannot be freely wheeled backwards. Since the chain connects the rear wheel and the pedals, when the rear wheels are rotated backwards, the pedals commence to rotate backwards, thereby applying the brakes and the bicycle stops. This inability to wheel the bike backwards is another severe drawback of these prior art systems.

A further problem with other mechanisms, shown in the prior art for back-pedal braking systems, is that they involve modifications to the bicycle structure itself; in addition many are complex. Systems of this type are not readily adaptable to existing bicycles, and their usefulness as commercially practical mechanisms is thereby limited because of the undue complications and expense of modifying the structure of the bicycle.

There are some ratchet-type mechanism shown in the prior art. These prior ratchet-type mechanisms have the disadvantages that they would continuously make clicking noises when pedaling forwardly, causing a continual annoyance. Also, the continuous scraping of the ratchet pawl produces a tiring dragging force which must be overcome by the leg muscles and causes a rapid wearing of the ratchet parts.

U.S. Pat. No. 765,945 — Weiler discloses a ratchet mechanism associated with the hub of the rear wheel for forcing a brake-shoe against the rear wheel. It involves complex pawls with offset dogs which, during forward rotation of the wheel, impinge against another spring biased stationary dog which is thereby lifted against the spring force. It appears to me this dog impingement would cause a continuous clicking noise and rapid wear during forward travel, and that the brake would become applied upon wheeling the bicycle backward. Also, this Weiler mechanism is not usable in chain derailer bicycles because during braking action a reverse load is transferred through the chain to the rear sprocket to actuate the brake shoe against the rear wheel.

U.S. Pat. No. 639,265 — Morris discloses a complex ratchet mechanism for swinging a brake member against the tire of the rear wheel when the rider back pedals. The ratchet mechanism is very complex with plural radial springs and plural transverse springs, plus a large coil spring within the pedal crank bearing housing, which involves modifications of the bearing housing itself and precludes retrofit installation on existing multi-speed bicycles. Also, it does not appear to me that this complex Morris mechanism can be installed on a one-piece pedal crank.

U.S. Pat. No. 633,605 — McAnulty, et al show a ratchet mechanism associated with the pedal crank shaft in which the pawl rides continually upon the ratchet teeth when the rider pedals forward, thus producing noise, resultant wear and frictional drag. The McAnulty, et al. brake becomes applied when the bicycle is wheeled backward and this ratchet brake mechanism has a wheel "lock-up" problem upon full stop with forceful brake application, as explained above.

U.S. Pat. No. 1,483,690 — Spedding describes a ratchet mechanism associated with the pedal crank which produces a continual clicking noise when pedaling forward and in which the brake is mechanically applied when the bicycle is wheeled backward, unless a hand release lever is moved to disable the pawls, in which event the brake cannot be applied by back pedaling. With a reasonably tight sprocket chain, the Spedding mechanism would exhibit a rear wheel "lock-up" problem after a full stop with forceful brake application. The Spedding mechanism appears to be limited to a one-speed bicycle inasmuch as the chain is driven backward when back pedalling to apply the brakes, and this backward chain motion is not suitable for multi-speed chain derailer type bicycles which have spring-biased slack take-up jockey wheels.

U.S. Pat. No. 2,094,687 — Thompson shows a combined ratchet and over-running clutch mechanism associated with the pedal crank which requires a modified pedal crank shaft to include a sleeve bearing about its bearinged portion. The braking force is applied through over-running clutch rollers, and two sets of ball bearings are shown in relatively exposed races near the single front sprocket, thus being subject to weathering and grit accumulation. The wide bulky Thompson mechanism is not suited for retrofitting on existing bicycles with conventional pedal cranks.

U.S. Pat. No. 2,186,816 — Bernier describes a complex dual ratchet and pawl mechanism associated with a wheel having the pedals on the same axle, like the front wheel of a tricycle. The pawls are gravity operated, not positively controlled, and a continual clicking of a pawl occurs during forward pedalling.

French Pat. No. 1,028,004 — Societe d'Appareils de Controle et d'Equipment de Moteurs was referred to during the prosecution of the parent application and reference may be made thereto for further information.

SUMMARY OF THE INVENTION

The present invention provides a back-pedal brake operator for bicycles which is advantageously conveniently and practically applicable to "chain-derailer" type bicycles as well as to multi-speed bicycles having gear mechanisms within the rear hub and also to one-speed bicycles and also in its presently preferred embodiment provides a braking system which automatically applies braking action to both wheels with a relatively greater braking effort being applied to the rear wheel than to the front wheel. The back-pedal brake operator of the present invention is universally adaptable to current popular bicycles without modification to frame, pedal crank, hub or other parts.

The back-pedal brake operator embodying this invention is a compact, self-contained unit comprising a self-contained sprocket-drive-and-brake-operator assembly. This assembly can advantageously be applied as a direct replacement for the existing standard sprocket, and mounts within the same clearance spaces, and uses the same mounting and driving means as the standard sprocket.

The back-pedal brake operator of the present invention is simple, reliable, safe and capable of operating in and withstanding the environmental conditions of mud, dirt, rain, etc. which are encountered in practical, everyday bicycle usage.

The back-pedal brake operator of the present invention does not exhibit lock-up problems when the bicycle is brought to a complete stop.

The back-pedal brake operator embodying this invention is not complex. It is easily manufacturable and practical to apply either to newly manufactured bicycles or as a retrofit assembly which can be supplied as a do-it-yourself kit to be applied to existing bicycles by their owners or by bicycle shops.

A further advantage of the back-pedal brake operator embodying the present invention is that the same strong connection between the pedal crank arm and the driving sprocket is used to apply the braking force.

The back-pedal brake operator of this invention can be used to brake either the rear wheel or the front wheel, or both, thereby using the powerful leg muscles to apply the brakes rather than the hands. This invention overcomes the disadvantages listed above for the hand-operated braking systems currently available in the marketplace for multi-speed bicycles. The rider can maintain a firm grip on the handle bar at all times while the brakes are being applied, and the handle bar is uncluttered. The braking action is obtained by turning the foot pedals rearwardly a short distance from any position which the pedals may occupy at the instant when the rider wishes to apply braking action without utilizing the sprocket chain to apply the braking force.

The back-pedal brake operator of this invention is adapted for adjustable automatic proportioning of the relative braking efforts to be exerted on the rear and front wheels to be incorporated. Thus, the ratio of the braking efforts applied respectively to the rear and front wheels can be predetermined by adjustment as may be desired over an operating range.

The back-pedal brake operator embodying this invention enables braking action to be applied by turning the foot pedals rearwardly a short distance from any position which the pedals may occupy at the instant when the driver wishes to apply braking action.

This invention enables dual-actuated braking systems to be installed on multi-speed bicycles so that the rider can apply the brakes either by foot or by hand, or by both.

Various objects, aspects and advantages of the present invention will become more fully understood from a consideration of the following detailed description of various embodiments of the invention.

BRIEF DESCRIPTION OF THE DRAWINGS

FIG. 1 is a side elevational view of the foot pedal crank and sprocket portion of a multi-speed chain derailer bicycle embodying the present invention. The pedal crank shaft is shown in section which is taken generally along the line 1—1 in FIG. 2 looking toward the left. In FIG. 1, the bicycle frame and crank shaft bearing housing are shown dash-and-dotted because they are above the plane of section 1—1 as taken. In FIG. 1, the parts and components are shown in their operating positions when the rider is pedaling forward in the normal manner;

FIG. 2 is a front elevational view of the pedal cranks and crank shaft bearing housing and adjacent portions of the bicycle frame with the compact self-contained sprocket-drive-and-brake-operator assembly being shown in section taken along the irregular line 2—2 in FIG. 1;

FIG. 3 shows a portion of the assembly of FIG. 1 with the parts and components relatively moved into their operating positions when braking effort is being applied by the rider;

FIG. 4 is a side-elevational view similar to FIG. 1, but showing a second embodiment of the sprocket-drive-and-brake-operator assembly of the invention. In FIG. 4, the pedal crank shaft is shown in section which is taken generally along line 4—4 in FIG. 5. A few portions of FIG. 4 are broken away for clarity of illustration, as will be explained. In FIG. 4, the parts and components are shown in the positions they occupy when the braking effort is being applied;

FIG. 5 is a front-elevational view of the pedal cranks and crank shaft bearing housing and adjacent portions of the bicycle frame with the sprocket-drive-and-brake operator assembly being shown in section as taken along the irregular line 5—5 in FIG. 4;

FIG. 6 is an enlarged partial sectional view as seen taken along the line 6—6 in FIG. 4, showing the engagement of a pawl with a ratchet gear when braking effort is applied;

FIG. 7 shows means for equalizing the braking forces applied to rear and front wheels;

FIG. 8 is a side elevational view with portions broken away showing the presently preferred embodiment of the sprocket-drive-and-brake-operator assembly of the present invention;

FIG. 9 is a front elevational view of the pedal cranks and crank shaft bearing housing and adjacent portions of the bicycle frame with the sprocket-drive-and-brake-operator assembly being shown in section taken along the irregular line 9—9 in FIG. 8;

FIG. 10 is an enlarged sectional view taken along the line 10—10 in FIG. 8 extending through the pawl and spring;

FIGS. 11 and 11A are enlarged views of the pawl for purposes of explantion;

FIG. 12 is a perspective view of the sprocket-drive-and-brake-operator assembly shown in FIGS. 8 and 9;

FIG. 14 is a schematic circuit diagram of the presently preferred braking system using the sprocket-drive-and-brake operator assembly of FIGS. 8–13.

Figure 13:
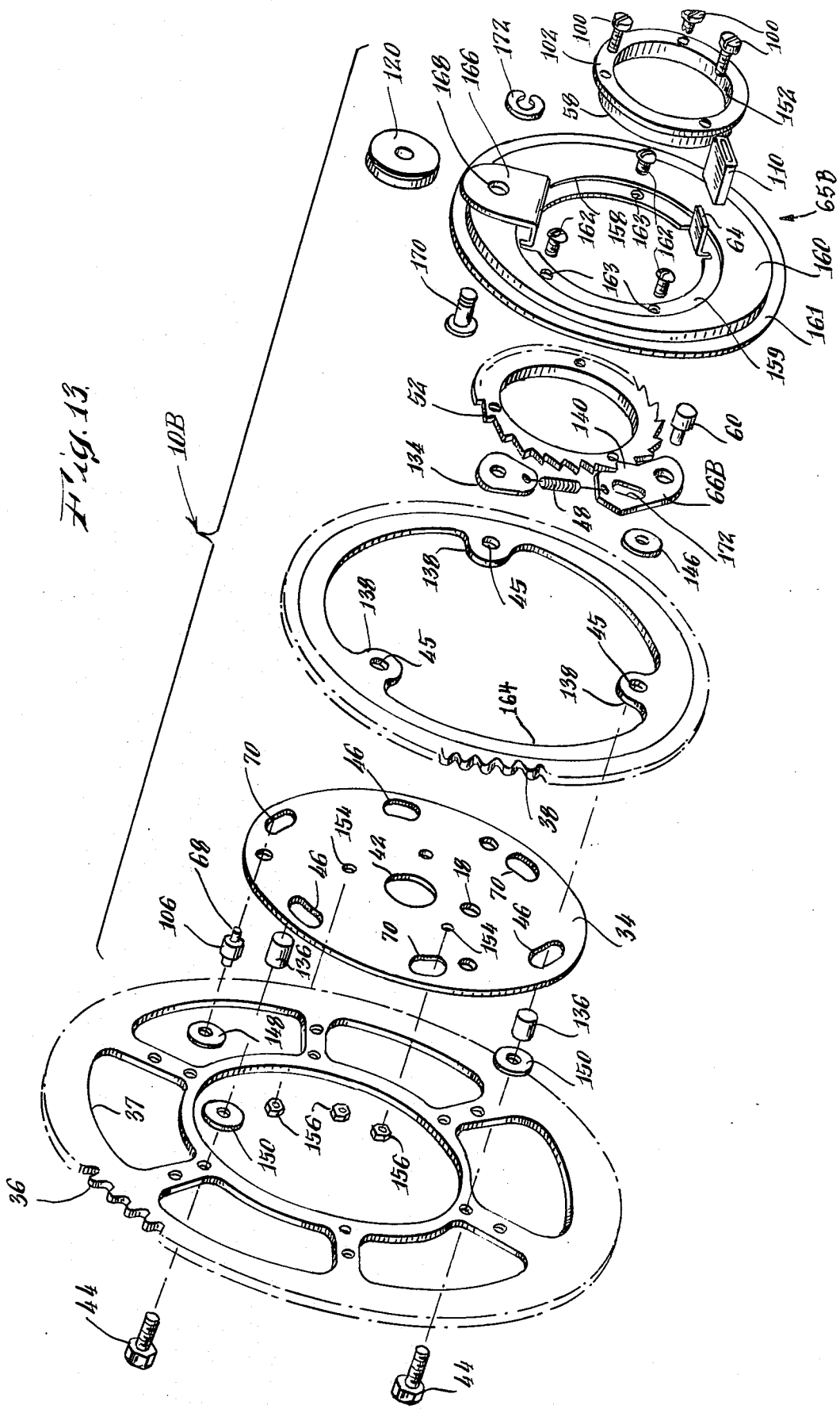
FIG. 13 is an exploded perspective view of the assembly shown in FIGS. 8, 9 and 12.

Throughout the various Figures, parts and components which are similar, bear the same reference numberals.

DETAILED DESCRIPTION

The brake system as a whole includes the compact, self-contained sprocket-drive-and-back-pedal-brake-operator assembly 10 (FIGS. 1 and 2) plus the cables or other connecting means for connecting the back-pedal brake operator 10 to the brakes. The brakes may be associated with the rear wheel or the front wheel, but preferably the brakes are associated with both wheels. Any type of brake means may be operated by the operator assembly 10 or 10A (FIGS. 4 and 5) or 10B (FIGS. 8–14) of the present invention.

The sprocket-drive-and-back-pedal-brake-operator assembly 10 is located on the right side of the bicycle in the position normally occupied by a conventional drive sprocket. This assembly 10 is shown mounted onto the one-piece pedal crank 12 in the same manner as a standard sprocket. That is, the assembly 10 is slipped over the left crank arm 12-1 (FIG. 2) and then over the center portion 12 (FIG. 1) of the crank 12 until the assembly 10 stops against the mounting flange 14 (FIG. 2) near the right pedal crank 12-2. A drive lug 16 on the right pedal crank arm 12-2 engages a socket hole 18 in the assembly 10. Such a drive lug 16 is conventionally provided on the right pedal crank arm of a one-piece pedal crank.

The right-hand bearing race cone 20-2 is then slipped over the left crank 12-1 and then over the center portion of the crank and is threaded up against the assembly 10, thereby retaining it. The pedal crank 12 with the assembly 10 attached is then installed in the bicycle in the normal fashion with the central portion of the crank 12 extending through the bearing housing 22 (FIG. 2) of the bicycle and with the left bearing race cone 20-1 being secured by a nut 24 or other conventional fastener. Within the bearing housing 22 of the bicycle are installed conventional anti-friction bearings associated with the left and right bearing race cones 20-1 and 20-2 for enabling the pedal crank shaft 12 to be revolved freely. It is among the many advantages of this invention that no structural modifications are required to be made to the conventional bearing housing 22 nor to the bearings which are housed within it. The pedals 26 (only one is shown) are conventional and are mounted on the outer ends of the left and right pedal crank arms 12-1 and 12-2.

The bicycle frame may have any conventional configuration, for example, as shown in FIGS. 1 and 2 there may be a forward frame member 28 extending forwardly and upwardly from the bearing housing 22 and an upper frame member 30 extending upwardly toward the region where the seat is located. A pair of rear frame members 32 extend rearward from the bearing housing 22. These rear frame members 32 straddle the rear wheel (not shown) and extend toward opposite ends of the rear axle.

The sprocket-drive-and-back-pedal-brake-operator assembly 10 includes a drive plate 34, to which is mounted the chain sprocket (a single sprocket in the case of a five-speed bicycle) or outer and inner sprockets 36 and 38, as shown. Two sprockets 36 and 38 are shown, for example, as in the case of a ten-speed chain derailer type bicycle. Large cut out openings 37 may be provided in the outer sprocket 36 to reduce its weight as is conventional. Also mounted to the drive plate 34 is a controlled ratchet and pawl mechanism 40 for operating the brake or brakes, as will be explained in detail below. This drive plate 34 has a center mounting hole 42 which fits snugly over the central portion of the crank 12 with the drive plate being concentric about the axis A (FIG. 1) of the pedal crank 12. The bearing race cone 20-2 screws up tightly against the inner portion of the drive plate 34 surrounding its center hole 42 for holding the drive plate 34 in place.

The forward and reverse torque forces are transmitted from the right pedal crank arm 12-2 through the conventional drive lug 16 located on the inside of this right pedal crank arm to the socket opening 18 which is located in the drive plate 34. Thus, the drive plate 34 is rigidly affixed to the pedal crank 12 and turns with this crank.

The chain sprockets 36 and 38 are mounted to the drive plate 34 in a manner which advantageously permits limited relative rotation of the sprockets with respect to the drive plate 34, about the center of the drive plate, i.e. about the axis A of the pedal crank 12. The drive plate 34 is sandwiched between the outer and inner sprockets 36 and 38. Fastening means 44 are provided for rigidly securing the two sprockets 36 and 38 together as an assembly, so that they move together as a unit. For example, in this sprocket assembly, as shown in FIG. 2, the fastening means comprise three shoulder bolts which are rigidly secured to the two sprockets 36 and 38, by screwing into threaded holes 45 in the inner sprocket 38 with the bolt shanks snugly engaging in holes in the outer sprocket 36 which are aligned with the threaded holes 45. The shoulders, or sleeves, on these bolts 44, as seen in FIG. 2, provide a slight clearance between the surfaces of the drive plate 34 and the two sprockets 36 and 38 between which the drive plate is sandwiched, thereby to permit the relative limited rotational movement mentioned above of the sprocket with respect to this drive plate. Any other fastening means 44, such as rivets or welded studs, may be used to secure the sprocket assembly together.

The fastening means 44 extend through elongated openings 46 in the drive plate 34 near the perimeter of this drive plate. These openings 46 are elongated in a circumferential direction concentric about the center of the mounting hole 42 to permit the limited relative rotation referred to above. Spring means 48 are provided to urge the sprocket assembly 36, 38 in a forward direction, i.e. in a counterclockwise direction as seen in FIG. 1, relative to the drive plate 34. The forward direction is the driving direction for propelling the bicycle as shown by the arrow F in FIG. 1. As shown, the spring means 48 are three similar tension springs, one end of each tension spring 48 being hooked to the sprocket assembly 36, 38, and the other end being hooked to the drive plate 34. Small holes are drilled in the drive plate and inner sprocket into which the respective ends of these tension springs are hooked. The inner sprocket 38 generally has a ring shape, as shown in FIG. 1, and the tension springs 48 are positioned within the clearance space available inside of the ring configuration of the inner sprocket 38.

These spring means 48 normally urge the sprockets 36 and 38 in a forward (counterclockwise in FIG. 1) direction relative to the drive plate 34, but the rider's legs normally urge the crank 12 and hence the drive plate 34 in a forward direction (counterclockwise) as the bicycle is being propelled. Thus, the upper run or stretch 41 of the chain 43 is in tension, which, in turn, urges the sprocket assembly 36, 38 in a clockwise direction in FIG. 1 relative to the drive plate, so that the force of the spring means 48 is overcome and these springs remain stretched, as shown in FIG. 1. Consequently, the torque being exerted by the driver's legs is transferred from the drive plate 34 to the sprocket assembly 36, 38 by the ends of the elongated openings 46 engaging the fastening means 44, as shown in FIG. 1. The torque of the sprocket assembly 36, 38 tensions the upper run 41 of the chain, thereby applying torque to the rear sprocket for propelling the bicycle.

Similarly, as the bicycle is wheeled backward, the rear wheel sprocket pulls on the upper run 41 of the chain 43, thus urging the sprocket assembly 36, 38 in a clockwise direction relative to the drive plate, thereby stretching the springs and retracting controlled pawls (to be explained) to cause the drive plate (and crank 12) to rotate clockwise so that the bicycle can be wheeled backward without the brake or brakes becoming applied.

As mentioned above, there is a controlled ratchet and pawl mechanism 40 mounted to the drive plate 34. This mechanism 40 is not a simple ratchet but rather it is a positively controlled ratchet mechanism. In this mechanism 40, the pawls are positively driven into engagement with the abutment teeth on a gear for applying braking effort when desired. These pawls are also positively driven away from engagement with the abutment teeth on the gear for releasing the brake before commencing to propel the bicycle forward, and when the bicycle is wheeled backwards, i.e. whenever the top run 41 of the sprocket chain 43 is under active load either forward or backward.

This controlled ratchet mechanism 40 includes a ratchet gear 52 rotatably mounted on the drive plate 34. In FIG. 1, as shown, the ratchet gear 52 is a ring gear having a large central opening 54 (FIG. 2) which advantageously fits around the fixed bearing housing 22 of the bicycle. Thus, the whole assembly 10 will fit onto the conventional bicycle without requiring modification thereof. This ratchet gear 52 includes a raised ring portion 56 (FIG. 2) which is held in concentric relationship with respect to the drive plate 34 by bearing 58 comprising three rollers which engage the perimeter of this ring portion 56 in rolling contact therewith.

These three rollers 58 are rotatably mounted on lugs 60 secured to the drive plate 34. As shown, the rollers 58 are axially retained on the lugs 60 by C-shaped retainers 62, which snap into grooves in the lugs 60. A controlled pawl 66 (FIG. 2) encircles each of the lugs 60 between the rollers 58 and the drive plate 34 serving to hold these rollers spaced away from the drive plate 34 to accommodate the periphery of the ratchet gear 52 in the resulting space between these rollers and the drive plate. Thus, the ratchet gear 52 is restrained from axial movement relative to the drive plate 34 because the outer face (its right face) of the ratchet gear rests against the drive plate while the rollers 58 overlap the peripheral portion of the inner face (its left face) of this ratchet gear.

The ratchet gear 52 is prevented from rotating in the forward direction F by a projecting stop pin element 64 (FIG. 2) which engages up against the underside of the rear bicycle frame member 32. This stop pin 64 is mounted on a brake actuator arm member 65 which is attached by a plurality of machine screws 67 to the raised ring portion 56 of the ratchet gear 52. When the ratchet gear 52 is turned in the reverse direction R, it serves to operate the brakes, as will be explained further below.

In order to turn the ratchet gear 52 in the reverse direction R for applying braking effort, there is provided one or more positively controlled pawls 66 pivotally mounted on the drive plate 34. In the assembly 10, as shown, the pawls 66 are pivotally mounted on the same lugs 60 as are used to mount the rollers 58, so that these pawls serve to hold the rollers spaced away from the drive plate 34, as discussed above. It is to be understood that the controlled pawls could be pivotally mounted upon other lugs similar to the lugs 60, in which case spacing washers would be provided between the rollers 58 and the drive plate. However, I prefer to use the lugs 60 in this embodiment for the dual purpose of mounting the rollers 58 as well as mounting the controlled pawls 66.

In order to produce the positive engagement or complete disengagement of the pawls 66 with the abutment teeth of the ratchet gear 52, there is provided one or more pawl-controlling cam pin elements 68 which are fixedly mounted to the sprocket assembly 36, 38. These pawl-controlling cam pin elements 68 extend through elongated slots 70 in the drive plate 14 for engaging cam surfaces 72 in the controlled pawls 66. The cam surfaces 72 are inclined with respect to a radius from the axis A of the crank 12 passing through the center of the pawl-controlling element 68. This inclination of the elongated cam surface 72 positively causes the controlled pawls 66 to withdraw from the ratchet gear 52 when the rider's legs turn the drive plate 34 forward (F) with respect to the sprocket assembly. Thus, when the rider is propelling the bicycle forward, the controlled pawls 66 are completely and positively retracted by cam pins 68 away from the ratchet gear. There is no frictional drag of these pawls against the ratchet teeth nor resultant clicking noises.

Further, when the drive plate 34 is rotated rearward (R) with respect to the sprockets as the rider starts to back pedal for applying the brake or brakes, the controlled pawls 66 are positively caused to engage against the abutment teeth of the ratchet gear 52. The elongated clearance slots 70 are concentric about the center of the drive plate 34 (concentric about axis A). The cam surfaces 72 comprise elongated openings in the pawls which are inclined with respect to the clearance slots 70, as explained above.

When the rider back pedals (R) for applying bracking effort, the driving torque is removed from the sprockets 36, 38, and the top run 41 of the chain becomes unloaded. The unloaded top run 41 of the chain allows the spring means 48, as shown in FIG. 3, to rotate the sprockets counterclockwise relative to the drive plate (i.e. the drive plate turns clockwise relative to the sprockets) thereby positively engaging the controlled pawls 66 with the abutment teeth of the sprocket gear 52. As the rider continues to exert torque in the back pedal (reverse) direction (R) (please see FIG. 3), the now-engaged pawls 66 drive the sprocket gear 52 in the reverse direction to swing the actuator arm member 65 down as indicated by the braking arrow B at the right. This brake actuator arm member 65 is connected by suitable connecting means 74 to the brake or brakes for the rear or front wheel or both.

In this embodiment, the connecting means 74 are a pair of Bowden wire cables 74-1 and 74-2, each having an attachment shackle 76. These shackles 76 are pivotally attached to selected holes 78 extending in a row along the upper edge of the actuator arm member 65. The flexible sheaths 80 of these Bowden cables 74 are terminated at anchoring bolts 82 secured by clamp means 84, adjustably mountable on the forward frame member 28 of the bicycle.

One of the connecting means 74-1 extends to the brake mechanism for one of the wheels and the other connecting means 74-2 extends to the brake mechanism for the other wheel. The row of attachment holes 78 and the pair of shackles 76 provide adjustment means by which the relative braking effort can be adjusted between the brakes for the rear and front wheels, as may be desired.

Generally speaking, the braking effort to be applied to the front wheel should not be unduly large as compared to the braking effort to be applied to the rear wheel because a sudden powerful braking effort could then pitch the bicycle and rider forward over the front wheel. A person's leg muscles are much more powerful than the hand muscles, so that a very powerful braking effort can be obtained using this invention. For braking action applied to the rear wheel, there tends to be a self-limiting braking effect. This self-limiting action occurs because the deceleration of the bicycle during braking tends to reduce the weight being carried by the rear wheel, thereby reducing the perpendicular force between the rear tire and the pavement, thus limiting the braking force to be exerted by the rear tire upon the pavement.

Advantageously, the rider or the bicycle shop can adjust the predetermined ratio of the braking efforts by the adjustment means 76 and 78, as may be desired.

Although two sprockets 36 and 38 are shown, it will be understood that the sprocket-drive-and-back-pedal-brake-operator assembly 10 can be provided with only one sprocket whenever desired. The missing sprocket is then replaced with a ring plate or equivalent member. Moreover, either the outer or inner sprocket 36 or 38 may be omitted, as desired.

There are four operating modes: (1) pedaling forward for propelling the bicycle; (2) pedaling backward, i.e. applying the brake or brakes; (3) wheeling the bicycle forward as by coasting forward or as by rolling the bicycle forward while the rider temporarily walks alongside, and (4) wheeling the bicycle backward as by rolling the bicycle backward while the rider temporarily walks alongside. It is also possible for the rider to coast backward, as a stunt, while sitting on the bicycle with his feet removed from the pedals 26, so that the spring means 48 become stretched and the drive plate 34 and pedal crank 12 are allowed to rotate in the reverse directions to follow the reverse motion of the chain 43 as it pulls the sprocket in reverse rotation.

When pedaling forward, the drive plate 34 moves forward (F) relative to the sprockets 36, 38, so the spring means 48 are stretched and the pawl controlling cam pin elements 68 cam the pawls 66 out of engagement, and normal forward pedaling operation occurs with the brake released and with the pawls 66 retracted completely out of engagement with the ratchet gear 52. Thus, there is no clicking nor ratcheting noise nor ratchet drag nor resulting wear of the teeth or pawls.

Pedaling backward removes the tension of the top run 41 of the chain 43 from the sprockets 36, 38 (i.e. the chain load is removed) while at the same time the pedal crank commences turning the drive plate 34 rearwardly. Thus, the drive plate 34 turns rearward (clockwise) relative to the sprocket or sprockets 36, 38 assisted by the springs 48. This relative motion causes controlled pawls 66 to engage the ratchet gear 52 and rotate it and its arm 65 in the reverse (clockwise) direction thereby applying the brakes, as shown in FIG. 3.

In wheeling or coasting forward, the over-running mechanism in the rear wheel hub allows the rear wheel to freely turn forward without revolving the chain.

In wheeling backward, the conventional over-running mechanism in the rear hub becomes engaged, thus pulling the top run 41 of the chain 43 rearward, i.e. to the right in the drawing. Thus, the sprocket or sprockets 36, 38 are turned rearward (clockwise) relative to the drive plate 34, so that the pawl control pins 68 are moved in the rearward direction causing the pawls 66 to be retracted away from the ratchet gear 52 while the springs 48 become stretched. Therefore, the brakes are not applied and the bicycle is allowed to wheel backwardly without the brakes becoming engaged. The pedal crank does revolve in the reverse direction when wheeling backward because the fastening bolts 44 engage against the rear of the slots 46 as urged by the spring means 48. It is to be understood that such backward wheeling or coasting of the bicycle can occur only if the springs 48 become stretched so that the pawls 66 become retracted, for otherwise the ratchet and pawl mechanism 40 becomes engaged and the brakes are applied.

Although the assembly 10 can advantageously be applied to a conventional one-piece crank 12, it can also be applied to pedal crank assemblies which are built up from several components. The drive plate 34 is driven by a drive lug 16 on the right pedal crank. Alternatively, the central hole 42 in the drive plate 34 is formed with a keyway and is keyed to the central portion of the pedal crank assembly, or the drive plate is keyed to the hub of the right pedal crank arm by a drive lug, key, or pin.

The spring means 48 are included to assure that the drive plate 34 will turn rearward (clockwise) relative to the sprocket assembly 36, 38 as the rider back pedals so that the controlled pawls 66 will engage the gear 52 to apply braking. In many cases, there is a slight but sufficient frictional drag in the overall chain system and associated rear sprocket and chain guides to produce this same braking result when back pedaling without the use of the spring means 48. Thus, these springs 48 are included as an assurance but they can be omitted.

As used herein, the term "sprocket assembly" is intended to mean a plurality of sprockets assembled together to rotate with each other as a unit. The term "sprocket means" is intended to be interpreted broadly to include either one or a plurality of sprockets.

In the sprocket-drive-and-back-pedal-operator assembly 10A, shown in FIGS. 4, 5 and 6, many of the parts and components are the same as in the operator assembly 10 of FIGS. 1–3. Only the differences will be described.

It is to be understood that this operator assembly 10A will provide the same four operating modes as discussed above.

The Bowden wire connecting means 74-1 and 74-2 are anchored to a drum actuator member 65A (FIGS. 4 and 5) by means of cylindrical end fittings 90 (FIG. 4) which are swaged onto the ends of the respective cables. These end fittings 90 engage in inclined slots 92 machined in the flanges 94 of the drum actuator member 65A. As shown in FIG. 4, the inclined slots 92 are positioned so that the cables are wrapped almost a full revolution around the actuator member 65A in the channel 96 between the flanges 94. By wrapping the cables around the actuator member 65A in this manner, the stress on the end fittings 90 is reduced.

This drum actuator member 65A is rotatably mounted to the drive plate 34 by securing it to a ring ratchet gear 52A which also is rotatable with respect to the drive plate. A plurality of fastening means 67, for example machine screws, secure the actuator member 65A and the ratchet gear 52A together as a unitary assembly.

In order to mount the sprocket ring gear and actuator assembly 52A, 65A onto the drive plate 34, as seen in FIG. 5, there is bearing ring means 58A secured to the drive plate 34 by means of suitable fasteners 100, for example machine screws. The bearing means 58A has a peripheral flange 102 (FIG. 5) which overlaps the inner edge of the ring ratchet gear, thus axially retaining the ratchet and drum actuator assembly 52A, 65A with respect to the inside surface of the drive plate.

Thus, in comparing the brake operator assemblies 10A and 10 of FIGS. 4–6 and 1–3, respectively, it is seen that in the operator assembly 10A, the ratchet ring gear and actuator assembly 52A, 65A is rotatably mounted to drive plate 34 by bearing means 58A engaging the interior perimeter of the ring portion of this assembly. In contradistinction, as seen in FIG. 1, the ratchet ring gear and actuator assembly 52, 65 is rotatably mounted to the drive plate 34 by roller bearing means 58 engaging the external perimeter of the ring portion 56 thereof.

The controlled pawls 66 (FIG. 6) are mounted on lugs 60 held by C-shaped retainers 62 and the pawl controlling cam pins 68 are secured to the sprocket assembly 36, 38 by suitable fastening means 104 such as a machine screw. As seen in FIG. 6, the cam pin 68 has an enlarged shoulder 106 for spacing the controlled pawl 66 away from the outer sprocket 36.

The stop means 64A for preventing forward rotation of the ratchet gear and brake actuator assembly 52A, 65A is a lug 108 secured to the inner surface of the drum 90 by a pair of machine screws. A resilient sleeve 110 (FIG. 4) of rubber or plastic surrounds this lug 108 for cushioning its contact with the rear frame member 32.

As seen in FIG. 4, the abutment surfaces 112 of the ratchet teeth are sloped slightly, so that these surfaces face directly toward the axis of the pivot mounting 60 for the control pawl 66. In other words, the surface 112 is exactly perpendicular to the line from the center of this surface 112 to the axis of the pivot pin 60. Thus, when the pawl is engaged, as shown in FIG. 4, there is no resultant radial force on the pawl because the thrust is directly along a line passing through the axis of the pivot 60.

The same comments about minor modifications within the scope of my invention apply to the sprocket-drive-and-back-pedal-brake-operator assembly 10A as apply to the assembly 10 FIGS. 1–3, namely, this assembly 10A can be applied to a one-piece crank or to pedal a crank which is built up from multiple parts. The spring means 48 are included in the assembly 10A for assurance, but such spring means can be omitted if there is sufficient frictional drag exerted by the chain 43. The sprocket means 36, 38 which is used with the assembly 10A may include one or more sprockets.

As shown in FIG. 7, the forces exerted on the brake means for the front and rear wheels may be equalized by forming the respective cables 74-1 and 74-2 as a continuous cable element extending in a U-bend 114 around a pulley sheave 120 rotatably mounted on a clevis 122 which is connected by a tension line 124, such as mechanical link or cable to a shackle 76 which is pivotally mounted to the actuator 65.

Alternatively, the actuator drum member 65A can be replaced by an actuator arm member 65 which is similar to the actuator arm member 65 (FIG. 1) but it is secured by fastening means 67 to the sprocket 52A. Then the shackle 76 (FIG. 7) is pivotally mounted to this actuator arm member 65.

In the presently preferred sprocket-drive-and-back-pedal-operator assembly 10B of FIGS. 8–14, many of the parts and components are similar to those of the operator assemblies 10 and 10A, described above. Only the significant differences will be described. The operator assembly 10B is preferred as being a neat, self-contained package from which foreign objects are excluded and which is well suited for mass production.

As shown in FIGS. 8 and 10, the three pawls 66B have small holes 132 located at their outer tip at the opposite end from their pivot lugs 60. The tension springs 48 have one end hooked through these holes 132, and their other end is anchored in a hole 130 in a thin flexible anchoring strap 134. These straps 134 may be made of strong, light, flexible slippery plastic and each has a larger hole for mounting on sleeve bushings 136 which surround the fastener 44 that secure the outer and inner sprockets 36 and 38 rigidly together. The thin straps 134 serve as slippery washers for spacing the inner sprocket 38 slightly away from the drive plate 34. The sleeve bushings 136 pass through the elongated openings 46 in the drive plate 34 and act as spacers for holding the sprockets 36 and 38 in spaced parallel relationship. The fasteners 44 are tightly screwed into the threaded holes 45 (FIG. 10) located in the tabs 138 (see also FIG. 13) which project inwardly from the ring-shaped inner sprocket 38.

The spring-anchoring straps 134 can swing freely about the spacer sleeves 136, so that these straps 134 are self-aligning with the pull of the springs 48. These springs 48 urge the sprocket assembly 36, 38 to turn in a counterclockwise direction relative to the drive plate 34, because the pawl 66B is mounted on pivot lug 60 which is secured to the drive plate 34, as shown in FIG. 10. Also, these springs urge the pawls 66B toward engagement with the ratchet gear 52.

As shown in FIGS. 8, 11 and 11a, the elongated openings in pawls 66B which define the inclined cam surface 72 are wider than the pin elements 68. Thus, the clearance space around the pin elements 68 within these inclined cam openings 72 allows the force of the springs 48 to move the pawls 66B into engagement with the ratchet gear 51 when the springs 48 are allowed (during back-pedal braking action) to turn the sprocket assembly 36, 38 counterclockwise relative to drive plate 34.

In order to provide a reaction force N (FIG. 11) acting toward engagement between each pawl 66B and the ratchet gear 52, there is a tooth 140 located on the inside edge of each pawl 66B. Consequently, when this pawl tooth 140 is engaged by the abutment face 112 of a tooth on the ratchet gear 52, the thrust T (FIG. 11) of the face 112 pressing against tooth 140 acts along a line of action 142 passing inside of the axis of rotation M of the pawl about its pivot lug 60. The result is to produce a torque reaction on the pawl acting in the direction N (FIG. 11), thereby driving the pawl more firmly toward engagement with the ratchet gear. In addition, the spring-connection hole 132 is further from the pivot axis M than the tooth 140, which provides a mechanical advantage for the spring force as it urges the pawl tooth toward engagement.

The pivot lug 60 has a countersunk rivet head 142 (FIG. 10) set into the outer surface of the drive plate 34. Pivot 60 has an enlarged shoulder 144 on which the pawl is mounted. A thin washer 146 which is preferably of slippery plastic spaces the pawl slightly away from the drive plate 34.

The pawl controlling cam pin 68 has a fastening head 104 (FIG. 10) riveted in a hole in the outer sprocket 36 and has an enlarged bearing shoulder 106. This bearing shoulder 106 passes through the elongated slot 70 (please see also FIG. 13) in the drive plate 34 for mounting the sprocket assembly 36, 38 onto the drive plate while permitting the limited relative rotation therebetween as discussed above. A thin washer 148 (FIG. 10) preferably of slippery plastic spaces the outer sprocket 36 slightly away from the drive plate 34. A similar washer 150 (FIG. 10) encircles each of the spacer bushings 136. Thus, neither of the sprockets 36 nor 38 can come into contact with either surface of the drive plate 34 by virtue of the various thin spacer elements 134, 148, 150.

The operator assembly 10B will provide the four operating modes as described above, and so they will not be described again. It is noted that when the rider pedals forward with the chain under load, the sprocket assembly 36, 38 turns in a clockwise direction relative to the drive plate 34 and the springs 48 become stretched. The relative turning motion causes the pin 68 to cam the pawl away from engagement with the sprocket 52, as shown in FIG. 11A. Thus, the pawls 66B are held away from engagement with the ratchet 51 at all times as the rider pedals forward with the chain under load.

I have found that the optimum overall performance of the operator assembly 10, 10A or 10B occurs when the cam surface 72 lies at an angle in the range from 26° to 36° (with my preferred angle being at about 31°) when the pawl is engaging the ratchet. This angle is measured relative to a straight line passing through the cam surface and tangent to a circle passing through the cam surface and concentric about the axis A.

This operator assembly 10B enables braking to be applied by back pedalling a short distance from any position which the pedals may occupy at any instant when the driver wishes to apply braking action. It is preferred and advantageous to have at least twenty-four teeth on the ratchet ring gear 52 providing an angular spacing of no more than 15° between teeth, so that the rider can achieve quick braking by back-pedalling a short distance from any pedal position. In this presently preferred embodiment there are thirty-six ratchet teeth on the gear 52, which are found to be optimum from an overall view of usage and manufacture. This means that there is an angular displacement of only 10° between teeth.

The ratchet ring gear 52 is rotatably mounted on the drive plate 34 by bearing means 58 in the form of a large ring having a peripheral flange 102 which overlaps the inner surface of the ratchet ring 52. This bearing ring 58 is preferred to be made of rigid slippery plastic, for example, such as "Teflon" polytetrafluoroethylene, "Delrin" or the like. It has a sufficiently large central opening 152 that it will advantageously clear the crank bearing housing 22 on a conventional bicycle frame. This opening 152 may encircle the crank bearing housing 22. The bearing ring 58 is secured to the drive plate 34 by bolts 100 passing through screw holes 154 (FIG. 13) and held by self-locking fiber insert nuts 156.

The whole sprocket-drive-and-brake operator assembly 10B is so compact that it will fit upon a conventional bicycle without structural modification of the bicycle frame, bearings or pedal crank.

In order to cover and protect the ratchet ring, pawls and springs and their associated working parts and to provide a neat, compact, self-contained operator assembly, the brake actuator 65B is now formed as an annular cover, as seen most clearly in FIG. 13. This cover 65B is formed of steel or other strong stampable material and has a large central opening 158 which encircles and clears the peripheral flange 102 on the bearing ring 58. The annular region of this cover 65B around the large opening 158 is stamped out of the plane of the cover as seen at 159 (FIG. 9), and the outer rim is similarly stamped at 161 to form an intervening clearance channel 160 (FIG. 9). The stamped cover region 159 seats against the inner surface of the ratchet ring gear 52 and is removably secured thereto by suitable fasteners 162, shown as machine screws which pass through holes 163 (FIG. 13) and thread into screw holes 164 in the ratchet 52. Thus, the whole cover 65B rotates backward a short distance in the braking direction B (FIG. 14) when back pedal action is used to apply the brakes.

The stamped cover (FIG. 9) is closely adjacent to (but spaced slightly away from) the inner surface of the inner ring sprocket 38, thereby protecting the working parts from entry of foreign objects. In this manner, the space within the large opening 164 (FIG. 13) within the inner sprocket 38 is advantageously used as a housing package. The annular cover 65B encloses the inner side of this package. The sprocket ring 38 encloses the package perimeter, while the drive plate disc 34 encloses the outer side of this package.

The stop 64 is formed by a tab bent out perpendicular to the plane of the cover and is surrounded by a resilient sleeve 110.

A pulley sheave 120 is mounted on the actuator cover 65B by bending a flap 166 radially out into spaced parallel relationship with the cover to form a bracket having a hole 168 therein. An axle pin 170 fits through the hole 168 and through a corresponding hole in the cover 65B and is held in place by a C-clip 172. It is noted that the pulley groove 174 (FIG. 9) is located near to the inner face of the sheave 120 for alignment with the line of pull on the Bowden wire cables 74-1 and 74-2 (see also FIG. 14).

The brake-actuation wire cables 74-1 and 74-2 are formed as a continuous cable element passing in a U-bend 114 around the pulley 120. Thus, tension forces are always automatically equalized in the two cable portions 74-1 and 74-2 extending to the front and rear wheel braking means 174 and 176. It is to be understood that these braking means 174 and 176 may be any strongly-built reliable braking mechanisms which are suitable for use of return springs.

By virtue of the fact that the tension forces are always equalized in the two cable portions 74-1 and 74-2, the braking force actually being applied to the rear wheel can be made greater than that being applied to the front wheel at all times by using a weaker return spring 178 (FIG. 14) associated with the rear braking means 176 and a stronger return spring 180 associatd with the front braking means 174. Since the leg muscles are relatively powerful, it is to be understood that the return springs 178 and 180 may be significantly more powerful than commonly used today. These return springs may be selected in various sizes (strengths) depending upon the rider.

An advantage of using stronger return springs 178 and 180 than commonly used is that the rider is provided with a good proportioning range of control over the applied brake force. That is, the rider can "feel" the brakes being applied with increasing force as the leg muscles are tightened against the opposing force of the strong return springs. There is a corresponding "feel" in the sole of the foot as the braking pressure is increased.

Instead of connecting the return springs 178 and 180 directly to the braking means 176 and 178, the return springs as shown at 178' and 180' may be connected to portions of the cables 74-1 and 74-2, as shown dotted. The other ends of the springs 178' and 180' are anchored to the bicycle frame as shown symbolically at 30 and 28. There may be flexible sheaths 80 which surround the wire cables 74-1 and 74-2 and which are anchored to the bicycle frame.

One further advantage of the braking system shown in FIG. 14 is that the adjustment of the brake is much less critical than with hand brakes, which are separately operated by the hands acting on separate hand levers. In the system of FIG. 14, the tension forces in the two cables are always equalized, whereas the cable tension forces produced by two hand-operated levers may be quite different from each other.

Further, the tolerances are much greater in the system of FIG. 14 than with hand brakes. When using hand brakes, the possible stroke of the hand levers is quite limited, because the levers "hit bottom" when they bump against the hand grips. Thus, the available cable motion is quite limited. However, with the system of FIG. 14, there is a much greater range of cable travel because the rider can back-pedal through a relatively great angular range of travel, that is the actuating pulley 120 can travel over a distance of 4 inches or more.

It was mentioned in the introduction that dual-actuated braking systems can be installed, if desired. This would be accomplished by connecting hand levers through separate cables (not shown) to the respective braking means 174, 176.

In each of the embodiments described above, the pawls are pivotally mounted upon the drive plate 34. For example, as seen most clearly in FIGS. 6 and 10, the pawls 66 and 66B are pivotally mounted by the lugs 60 onto the drive plate 34. Conversely, the pawl-controlling cam pin elements 68 are secured to the sprocket assembly by being mounted onto the outer sprocket 36. Thus, the pawls are controlled by the limited relative rotational motion between the sprocket assembly and the drive plate. It is to be understood that the mounting arrangement of the pawls and their controlling cam pins can be reversed, and thus the claims are to be interpreted with this possible reversal of components in mind. That is, the pawls can be pivotally mounted upon a sprocket and the pawl-controlling pins can be mounted onto the drive plate. Again, the pawls would be controlled by the relative rotational motion between the sprocket assembly and the drive plate. The arrangement as shown is preferred, but the reader should understand that this reversal of components is possible and has been conceived within the scope of the invention.

I claim:

1. A back-pedal brake operator for use on a multi-speed bicycle of the chain derailer type or gear shifter type having a frame, a pedal crank rotatably mounted on the frame, sprocket means for driving the chain and at least one brake mechanism, said operator comprising:
   drive plate means adapted for connection with the pedal crank for rotation therewith about the axis of rotation of the pedal crank,
   said drive plate means and said sprocket means being mounted for limited relative rotational motion therebetween,
   a ratchet gear having a plurality of ratchet teeth,
   a bearing member rotatably mounting said ratchet gear on said drive plate with said ratchet gear teeth extending around said axis concentric therewith, a brake actuator connected to said ratchet gear for movement therewith for actuating said brake mechanism, a stop member engageable with the frame for preventing said brake actuator and ratchet gear from rotating in the forward direction when the rider pedals the pedal crank forwardly, at least one pawl pivotally mounted on one of said means and engageable with and disengageable from said ratchet gear, at least one pawl control element mounted on the other of said means for causing each such pawl to move into engagement with said ratchet gear in response to the limited relative rotational motion occuring in one direction between said drive plate means and said sprocket means upon back pedalling by the rider for turning said brake actuator in the reverse direction for actuating the brake means, and said pawl control element being adapted for causing disengagement of said pawl from said ratchet gear in response to the limited relative rotational motion occurring in the other direction between said drive plate means and said sprocket means upon forward pedalling of said pedal crank against a chain load on said sprocket means.

2. A back-pedal brake operator, as claimed in claim 1, in which:

each pawl has an inclined cam slot therein, and each pawl control element engages in the inclined cam slot of the pawl for camming the pawl into engagement with said ratchet gear in response to said limited relative rotational motion in said one direction and for camming the pawl out of engagement with said ratchet gear in response to said limited relative rotational motion in the opposite direction.

3. A back-pedal brake operator, as claimed in claim 1, in which:

a spring is operatively associated with each pawl for urging the pawl toward engagement with said ratchet gear, each pawl has an inclined cam surface thereon, and each pawl control element causes each pawl to move into engagement with said ratchet gear by moving with respect to said inclined cam surface for allowing the spring to move the pawl into engagement in response to said limited relative rotational motion in said one direction upon back pedalling and each pawl control element causes disengagement of each pawl by camming the pawl out of engagement with said ratchet gear in response to said limited relative rotational motion in the opposite direction upon forward pedalling against a chain load.

4. A back-pedal brake operator, as claimed in claim 3, in which:

said inclined cam surface lies at an angle of from 26° to 36° when said pawl is engaging said ratchet gear, said angle being relative to a line passing through said cam surface and tangent to a circle concentric about said axis.

5. A back-pedal brake operator, as claimed in claim 3, in which:

each such pawl engages one of the ratchet teeth along a thrust line which passes between the axis of pivot mounting of said pawl and the axis of the ratchet gear, whereby the thrust of engagement tends to turn the pawl more firmly toward engagement with the ratchet tooth.

6. A back-pedal brake operator, as claimed in claim 1, for use on a bicycle having front and rear brake mechanism assoiated with the respective front and rear wheels, in which:

said brake actuator includes a pulley wheel which is moved by said brake actuator, a cable for simultaneously operating both said front and rear brake mechanisms has its opposite end portions operatively connected to said front and rear brake mechanism, said cable passes in a U-bend around said pulley wheel for exerting equalized cable tension forces from said brake actuator through the opposite end portions of the cable, and stronger and weaker return springs operatively associated with the front and rear brake mechanisms, respectively, for opposing the equalized cable tension forces in the opposite end portions of the cable for automatically causing a greater resultant effective force to be applied to the rear brake mechanism than to the front brake mechanism.

7. A back-pedal brake operator, as claimed in claim 1, in which:

said ratchet gear has at least twenty-four uniformly spaced teeth for providing an angular displacement of no more than 15° between successive teeth.

8. A back-pedal operator, as claimed in claim 1, in which:

said bearing member rotatably mounts said ratchet gear on the inside of said drive plate means, said pawl is also located on the inside of said drive plate means, and said brake actuator is an annular cover having its perimeter located adjacent to said sprocket means for enclosing and protecting said pawl and ratchet gear between said annular cover and said drive plate means, thereby forming a neat, compact, self-contained package unit.

9. A back-pedal operator, as claimed in claim 8, in which:

said annular cover is stamped for forming an annular clearance channel therein extending concentrically around the axis of the pedal crank for providing clearance space between said drive plate means and said annular cover, thereby forming a neat, compact, self-contained package unit.

10. A back-pedal brake operator as claimed in claim 1, in which:

said drive plate means has a central hole for mounting about the axis of rotation of the pedal crank between the bicycle frame and the pedal crank, said drive plate means having an opening therein spaced away from the axis of rotation for engagement by a lug on said pedal crank for causing the drive plate to rotate with the pedal crank, said sprocket means being positioned near the outer surface of said drive plate between the drive plate and said pedal crank, said ratchet gear being mounted near the inner surface of said drive plate means, said pawl being pivotally mounted on the inner surface of said drive plate means, and said pawl control means including a pin element connected to the sprocket means and extending through an elongated opening in said drive plate means from the outside surface to the inside surface thereof for controlling said pawl.

11. A back-pedal brake operator for use on a multi-speed bicycle of the chain derailer type or gear shifter type having first brake means associated with the front wheel and second brake means associated with the rear wheel and having a pair of pedal crank arms on a crank shaft rotatably mounted in a bearing housing on the bicycle frame for propelling the bicycle when said crank shaft is rotated in the forward direction about its axis by the rider pedalling in the forward direction, said back-pedal brake operator comprising:

a drive plate mounted for rotation about said axis with the pedal crank arms and crank shaft, said drive plate having a plurality of arcuate slots therein concentric about said axis of rotation, at least one chain sprocket for driving a chain for driving the rear wheel, a plurality of fastening means for mounting said sprocket onto said drive plate, said fastening means engaging said arcuate slots for holding said sprocket concentric about said axis of rotation and for permitting limited relative turning movement between said sprocket and said drive plate, a ratchet ring gear having multiple ratchet teeth, bearing means rotatably mounting said ratchet ring gear on said drive plate concentric about said axis of rotation, stop means engageable with the bicycle frame for preventing said ratchet ring gear from turning in the forward direction when the rider is pedalling in the forward direction, a brake actuator means connected to said ratchet ring gear, said brake actuator being adapted to be coupled to the first and second brake means for simultaneously applying braking action to both the front and rear wheels when the ratchet ring gear is turned in the reverse direction, a ratchet pawl pivotally connected to said drive plate and adapted to engage the ratchet teeth for turning said ratchet ring gear in the reverse direction when the drive plate is turned in the reverse direction by the rider back pedalling, spring means for urging said sprocket to turn a limited amount forwardly relative to said drive plate when the chain is unloaded and said spring means permitting said sprocket to turn a limited amount rearwardly relative to said drive plate as the rider is pedalling forwardly with the chain under load, and pawl control means operatively connected to said sprocket and engageable with said pawl for disengaging said pawl from said ratchet teeth in response to said limited relative turning movement occurring upon the rider pedalling forwardly with the chain under load and for causing said pawl to engage with said ratchet teeth as the rider back pedals for turning the ratchet ring gear in the reverse direction, thereby simultaneously to apply braking action to both the front and rear wheels when the rider back pedals.

12. A back-pedal brake operator, as claimed in claim 11, in which:

said drive plate has a central hole for mounting on the crank shaft between one end of the bearing housing and one of the crank arms, said drive plate having an opening therein spaced away from the axis of rotation for engagement by a lug on said one crank arm for causing the drive plate to rotate with the pedal crank arms and crank shaft, said sprocket being positioned near the outer surface of said drive plate between the drive plate and said one crank arm, said ratchet ring gear being mounted near the inner surface of said drive plate, said pawl being pivotally mounted on the inner surface of said drive plate, and said pawl control means including a pin element connected to the sprocket and extending through an elongated opening in said drive plate from the outside surface to the inside surface thereof for controlling said pawl.

13. A back-pedal brake operator as claimed in claim 11, in which:

said brake actuator means include an annular cover enclosing said pawl, spring means and pawl-control means, said annular cover being located on the side of said brake operator toward the bicycle frame, a pulley sheave mounted on said annular cover offset from the crank shaft axis, said pulley sheave being adapted to engage a U-bend in a cable whose opposite end portions are connected to the respective brake mechanisms for simultaneous actuation thereof by equal tension forces in said cable end portions upon back pedalling, and first and second return spring means are operatively associated with said first and second brake means, respectively for opposing the tension force in the respective end portions of the cable, and the return spring means associated with the brake mechanism for the front wheel is stronger than that associated with the brake mechanism for the rear wheel, whereby greater braking effort is automatically exerted on the rear wheel than the front wheel.

14. A back-pedal brake operator assembly for use on a multi-speed bicycle of the chain derailer type having a plurality of chain sprockets and first brake means associated with the front wheel and second brake means associated with the rear wheel and having a pair of pedal crank arms on a crank shaft rotatably mounted in bearing housing on the bicycle frame for propelling the bicycle when said crank shaft is rotated in the forward direction about its axis by the rider pedalling in the forward direction, said back-pedal brake operator assembly comprising:

a drive plate mounted for rotation about said axis with the pedal crank arms and crank shaft, said drive plate having a plurality of slots therein elongated concentric about said axis of rotation, a first of said chain sprockets being positioned outside of said drive plate and a second of said chain sprockets being positioned inside of said drive plate with said drive plate being compactly sandwiched between said first and second sprockets, a plurality of fastening means for rigidly interconnecting said sprockets for forming a sprocket assembly and for mounting said sprockets onto said drive plate, said fastening means extending between said first and second sprockets through said elongated slots for holding said sprockets concentric about said axis of rotation and for permitting limited relative rotational movement between said sprocket assembly and said drive plate, a ratchet ring gear having multiple ratchet teeth, bearing means rotatably mounting said ratchet ring gear on the inside of said drive plate concentric about said axis of rotation, stop means engageable with the bicycle frame for preventing said ratchet ring gear from turning in the forward direction when the rider is pedalling in the forward direction, brake actuator means connected to said ratchet ring gear, said brake actuator means being adapted to be coupled to the first and second brake means for simultaneously applying braking to both the front and rear wheels when the ratchet ring gear is turned in the reverse direction, at least one ratchet pawl pivotally connected to said drive plate and adapted to engage the ratchet teeth for turning said ratchet ring gear in the reverse direction when the drive plate is turned in the reverse direction by the rider back pedalling, spring means for urging said sprocket assembly to turn a limited amount forwardly relative to said drive plate when the chain is unloaded and said spring means permitting said sprocket assembly to turn a limited amount rearwardly relative to said drive plate as the rider is pedalling forwardly with the chain under load, and pawl control means operatively connected to said sprocket assembly and engageable with said pawl and responsive to the limited relative turning motion between said sprocket assembly and drive plate for disengaging said pawl from said ratchet teeth as the rider pedals forwardly with the chain under load and for engaging said pawl with said ratchet teeth as the rider back pedals, thereby simultaneously to brake the front and rear wheels as the rider back pedals.

15. A back-pedal brake operator assembly, as claimed in claim 14, in which:

said spring means also urges said pawl toward engagement with said ratchet ring gear, and said pawl has an inclined cam surface which is engaged by said pawl control means for camming said pawl away from said ratchet ring gear as the rider is pedalling forwardly with the chain under load and said pawl providing clearance on the opposite side of said panel control means from said cam surface for allowing said spring means to move said pawl into engagement with the ratchet ring gear as the rider back pedals.

16. A back-pedal brake operator assembly, as claimed in claim 15, in which:

said cam surface is defined by an inclined slot in said pawl, said pawl control means including a pin projecting into said inclined slot, and said inclined slot being wider than said pin in the radial direction for providing said clearance.

17. A back-pedal brake operator assembly, as claimed in claim 15, in which:

said inclined cam surface is inclined at an angle in the range from 26° to 36° relative to a line passing therethrough and tangent to a circle concentric about the axis of rotation of said crank shaft.

18. A back-pedal brake operator assembly, as claimed in claim 14, in which:

said ratchet ring gear has at least twenty-four uniformly spaced teeth so that the angular spacing between each successive tooth is no more than 15°.

19. A back-pedal brake operator assembly, as claimed in claim 14, for use on a bicycle having front and rear braking means operatively associated with the front and rear wheels, respectively, in which:

said brake actuator means includes a pulley engageable with a U-bend in a cable whose opposite end portions are connected to the front and rear braking means for exerting equal tension forces in the two cable end portions, and front and rear return spring means operatively associated with said two cable end portions for oppositing the tension force therein, said front return spring means being stronger than said rear return spring means for automatically exerting greater braking effort on the rear wheel.

20. A back-pedal brake operator for use on a bicycle having a pedal crank, sprocket means, and brake means, said operator comprising:

a drive plate adapted for connection with the pedal crank for rotation therewith about the axis of rotation of the pedal crank, a ratchet gear having a plurality of ratchet gear teeth, bearing means rotatably mounting said ratchet gear on said drive plate with said ratchet gear teeth extending around said axis concentric therewith, a brake actuator connected to said ratchet gear for movement therewith for actuating said brake means, means for preventing said brake actuator and ratchet gear from rotating in the forward direction when the operator pedals forwardly, at least one pawl pivotally mounted on said drive plate and engageable with and disengageable from said ratchet gear, pawl control means for moving each said pawl into engagement with said ratchet gear during back pedalling by the rider for turning said brake actuator in the reverse direction for actuating the brake means, and said pawl control means being adapted for connection to the sprocket for causing disengagement of said pawl from said ratchet gear upon forward pedalling of said pedal crank against a chain load on said sprocket.

21. A back-pedal brake operator as claimed in claim 20, for use on a bicycle having first and second brake means associated with the respective front and rear wheels, in which:

said brake actuator includes a pulley wheel which is moved by said brake actuator, a cable for simultaneously operating both said first and second brake means has its opposite ends operatively connected to said first and second brake means, and said cable passes in a U-band around said pulley wheel, whereby equalized braking effort is advantageously applied by said brake actuator to the first and second brake means for the respective front and rear wheels when the rider back pedals.

22. A back-pedal brake operator for use on a multi-speed bicycle of the chain derailer type or gear shifter type having at least one brake mechanism associated with a wheel and having a pair of pedal crank arms attached to a crank shaft rotatably mounted in a bearing housing on the bicycle frame for propelling the bicycle when said crank shaft is rotated in the forward direction, said back-pedal brake operator comprising:

a drive member rigidly affixed to the pedal crank shaft to turn with the crank shaft about the axis of rotation of the crank shaft, sprocket means associated with said pedal crank shaft and being rotatably mounted concentric about said axis for permitting rotational motion of said sprocket means relative to said drive member, said sprocket means being adapted to be engaged with a drive chain for driving the bicycle, brake actuator means mounted for free rotational motion about the axis of the pedal crank shaft, said brake actuator means including a ring member having a sufficiently large diameter to encircle said bearing housing and bearing means rotatably mounting said ring member upon said drive member in position to encircle said housing concentric about said axis, and a brake actuator member attached to said ring member, said brake actuator member being connectible to said brake mechanism for applying braking effort thereto, stop means for preventing said brake actuator means from rotating in the forward direction when the crank shaft is being pedalled in the forward direction, controlled unidirectional drive means operatively interposed between said drive member and said brake actuator means and responsive to limited relative motion of said sprocket means with respect to said drive member in one direction produced by chain loading for permitting free rotation of said drive member with respect to said brake actuator means whereby the brake actuator means does not apply braking effort during chain loading produced by forward pedalling or when the bicycle is wheeled backwards, and said controlled unidirectional drive means being responsive to limited relative motion of said sprocket means with respect to said drive member in the other direction produced by unloading of said chain for interconnection said drive member and said brake actuator means for applying braking effort when the bicycle rider back pedals.

23. A back-pedal brake operator as claimed in claim 22, in which said controlled unidirectional drive means comprises:

a ratchet gear associated with said ring member, said ratchet gear having a plurality of teeth extending concentrically about said axis, a controlled pawl pivotally mounted upon the drive member, and control means responsive to said limited relative rotation between the sprocket means and drive member for moving said pawl into engagement with said ratchet gear by back pedalling and for retracting said pawl away from said ratchet gear during chain loading produced by forward pedalling and during chain loading produced by wheeling the bicycle backwards.

24. A back-pedal brake operator as claimed in claim 23, in which:

said bearing means is a bearing ring mounted on said drive member concentric about said axis of rotation, said bearing ring rotatably supporting said ring member, and said bearing ring also has a sufficiently large diameter to encircle said bearing housing concentric about said axis, whereby said brake actuator can be conveniently retrofitted on such multi-speed bicycles as well as being installable on new bicycles being manufactured without structural modification of the bicycle frame, pedal crank bearing housing, bearings or pedal crank.

25. A back-pedal brake operator as claimed in claim 23, in which:

said bearing is a plurality of rollers pivotally mounted on said drive member and spaced about said axis of rotation, said rollers engaging said ring member for rotatably supporting said ring member upon said drive member.

26. A back-pedal brake operator for use on a multi-speed bicycle of the chain derailer type or gear shifter type having at least one brake means associated with at least one wheel and having a pair of pedal crank arms attached to a crank shaft rotatable mounted in a bearing housing on the bicycle frame for propelling the bicycle when said crank shaft is rotated in the forward direction, said back-pedal brake operator comprising:

a drive plate adapted for mounting on the crank shaft between the bearing housing and one of the pedal crank arms for rotation with the crank shaft, a brake actuator assembly connectible to said brake means for applying braking effort thereto, bearing means rotatably mounting said brake actuator assembly upon said drive plate, means preventing said brake actuator assembly from turning in the forward direction as the rider pedals forward, sprocket means mounted upon the drive plate for limited rotational movement relative to said drive plate, said sprocket means being adapted for engagement with a drive chain, controlled unidirectional drive means including first and second engageable elements, one of said engageable elements being carried by said brake actuator assembly for motion therewith;

the other of said engageable elements being carried by said drive plate for motion therewith, one of said engageable elements being movable between either of two positions in one of which positions said one engageable element is engaged with the other engageable element for preventing any relative rotation between said brake actuator assembly and said drive plate and in the other of which positions said one engageable element is retracted from the other engageable element for permitting said drive plate to rotate in the forward direction, control means for controlling the engagement and retraction of said one engageable element, said control means being actuated by the limited relative rotational motion between said drive plate and said sprocket means for retracting said one engageable element when the chain is under load and engaging said one engageable element with the other engageable element when the rider back pedals for moving said brake actuator to apply braking effort, said bearing means being a bearing ring of sufficiently large diameter to encircle said bearing housing, said bearing ring being attached to said drive plate in a position to encircle said bearing housing, said one engageable element included in said brake actuator assembly being a ratchet ring gear encircling said bearing ring, and said other engageable element being a controlled pawl pivotally mounted upon said drive plate, and said control means retracts said pawl away from said ratchet ring gear in response to said limited rotational motion in a first direction when said chain is under load and moves said pawl into engagement with said ratchet ring gear in response to said limited rotational motion in a second direction when said chain is unloaded as the rider back-pedals said crank shaft for applying braking effort to said brake means, whereby said back-pedal brake operator can be conveniently retrofitted on existing multi-speed bicycles as well as being installed on new bicycles being manufactured without structural modification of the bicycle frame or pedal crank bearing housing and bearings.

27. A back-pedal brake operator for use on a multi-speed bicycle of the chain derailer type or gear shifter type having at least one brake means associated with at least one wheel and having a pair of pedal crank arms attached to a crank shaft rotatably mounted in a bearing housing on the bicycle frame for propelling the bicycle when said crank shaft is rotated in the forward direction, said back-pedal brake operator comprising:

a drive plate adapted for mounting on the crank shaft between the bearing housing and one of the pedal crank arms for rotation with the crank shaft, a brake actuator assembly connectible to said brake means for applying braking effort thereto, bearing means rotatably mounting said brake actuator assembly upon said drive plate, means preventing said brake actuator assembly from turning in the forward direction as the rider pedals forward, sprocket means mounted upon the drive plate for limited rotational movement relative to said drive plate, said sprocket means being adapted for engagement with a drive chain, controlled unidirectional drive means including first and second engageable elements, one of said engageable elements being carried by said brake actuator assembly for motion therewith, the other of said engageable elements being carried by said drive plate for motion therewith, one of said engageable elements being movable between either of two positions in one of which positions said one engageable element is engaged with the other engageable element for preventing any relative rotation between said brake actuator assembly and said drive plate and in the other of which positions said one engageable element is retracted from the other engageable element for permitting said drive plate to rotate in the forward direction, control means for controlling the engagement and retraction of said one engageable element, said control means being actuated by the limited relative rotational motion between said drive plate and said sprocket means for retracting said one engageable element when the chain is under load and engaging said one engageable element with the other engageable element when the rider back pedals for moving said brake actuator to apply braking effort, said sprocket means including a plurality of sprockets in spaced parallel relationship concentric about the axis of said pedal crank shaft, said drive plate being sandwiched between a pair of said sprockets, a plurality of fastening means extending between said pair of sprockets, and said drive plate having a plurality of circumferentially elongated openings therein and said fastening means extending through respective ones of said elongated openings for mounting said sprockets upon said drive plate while providing for limited rotational movement relative to said drive plate, whereby said back-pedal brake operator can be conveniently retrofitted on existing multi-speed bicycles as well as being installed on new bicycles being manufactured without structural modification of the bicycle frame or pedal crank bearing housing and bearings.

28. A back-pedal brake operator for use on a multi-speed bicycle of the chain derailer type or gear shifter type having at least one brake mechanism associated with a wheel and having a pair of pedal crank arms attached to a crank shaft rotatably mounted in a bearing housing on the bicycle frame for propelling the bicycle when said crank shaft is rotated in the forward direction, said back-pedal brake operator comprising:

drive member means for coupling to the pedal crank shaft to turn with the crank shaft about the axis of rotation of the crank shaft, sprocket means associated with said pedal crank shaft and being mounted in encircling relationship about the axis of said crank shaft and being movable for permitting limited relative rotational motion of said sprocket means with respect to said drive member means, said sprocket means being adapted to be engaged with a drive chain for driving the bicycle, a brake actuator assembly mounted for free rotational motion about the axis of the pedal crank shaft, said brake actuator assembly including a ring member having a sufficiently large diameter to encircle said bearing housing on the bicycle frame, bearing means rotatably mounting said ring member upon said drive member means in position to encircle said housing concentric about said axis, whereby said brake operator can be conveniently retrofitted on such multi-speed bicycles as well as being installable on new bicycles being manufactured without structural modification of the bicycle frame, pedal crank bearing housing, bearings or pedal crank, a ratchet gear associated with said ring member, said ratchet gear having a plurality of teeth extending concentrically about said axis, a brake actuator member attached to said ring member, said brake actuator member being connectible to said brake mechanism for applying braking effort thereto, stop means for preventing said brake actuator assembly from rotating in the forward direction when the crank shaft is being pedalled in the forward direction, controlled unidirectional drive means operatively interposed between said drive member means and said brake actuator assembly and responsive to limited relative motion of said sprocket means with respect to said drive member means in one direction produced by chain loading for permitting free rotation of said drive member means with respect to said brake actuator assembly, whereby the brake actuator assembly does not rotate during chain loading produced by forward pedalling or when the bicycle is wheeled backwards, and said controlled unidirectional drive means being responsive to limited relative motion of said sprocket means with respect to said drive member means in the other direction produced by unloading of said chain for interconnecting said drive member means and said brake actuator assembly for applying braking effort when the bicycle rider back pedals, said controlled unidirectional drive means including:

a controlled pawl pivotally mounted upon one of said drive member means and said sprocket means, and a control element mounted upon the other of said means and responsive to said limited relative rotation between the sprocket means and drive member means for causing said pawl to move into engagement with said ratchet gear upon back pedalling and for retracting said pawl away from said ratchet gear during chain loading produced by forward pedalling and during chain loading produced by wheeling the bicycle backwards.

29. A back-pedal brake operator, as claimed in claim 28, in which:
said bearing means is a brearing ring mounted on said drive member means concentric about said axis of rotation, said bearing ring rotatably supporting said ring member, and
said bearing ring also has a sufficiently large diameter to encircle said bearing housing concentric about said axis.

30. A back-pedal brake operator, as claimed in claim 28, in which:
said bearing means is a plurality of rollers pivotally mounted on said drive member means and spaced about said axis of rotation, said rollers engaging said ring member for rotatably supporting said ring member upon said drive member means.

31. A back-pedal brake operator, as claimed in claim 28, in which:
spring means are provided for urging said pawl toward engagement with said ratchet gear, and
said control element allows said spring means to move said pawl intp engagement with said ratchet gear upon back pedalling.

* * * * *